United States Patent
Roddy et al.

(10) Patent No.: US 9,051,505 B2
(45) Date of Patent: Jun. 9, 2015

(54) PLACING A FLUID COMPRISING KILN DUST IN A WELLBORE THROUGH A BOTTOM HOLE ASSEMBLY

(71) Applicant: Halliburton Energy Services, Inc., Houston, TX (US)

(72) Inventors: Craig Wayne Roddy, Duncan, OK (US); Clive Denis Menezes, Conroe, TX (US); James Robert Benkley, Duncan, OK (US); Darrell Chad Brenneis, Marlow, OK (US); Jiten Chatterji, Duncan, OK (US); Ronnie Glen Morgan, Waurika, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/091,332

(22) Filed: Nov. 26, 2013

(65) Prior Publication Data

US 2014/0083699 A1     Mar. 27, 2014

Related U.S. Application Data

(60) Continuation-in-part of application No. 13/851,925, filed on Mar. 27, 2013, now Pat. No. 8,691,737, which is a division of application No. 13/725,833, filed on Dec. 21, 2012, now Pat. No. 8,505,630, which is a (Continued)

(51) Int. Cl.
| | |
|---|---|
| *C09K 8/46* | (2006.01) |
| *C04B 28/02* | (2006.01) |
| *C04B 28/04* | (2006.01) |
| *C09K 8/40* | (2006.01) |

(Continued)

(52) U.S. Cl.
CPC .................. *C09K 8/46* (2013.01); *C04B 28/021* (2013.01); *C04B 28/04* (2013.01); *C09K 8/40* (2013.01); *C09K 8/424* (2013.01); *C09K 8/473* (2013.01); *C09K 8/48* (2013.01); *C09K 8/487* (2013.01); *E21B 33/13* (2013.01); *C04B 2111/00017* (2013.01); *C09K 2208/10* (2013.01)

(58) Field of Classification Search
None
See application file for complete search history.

(56) References Cited

U.S. PATENT DOCUMENTS

| 1,931,921 A | 10/1933 | Breerwood |
| 2,021,956 A | 11/1935 | Gladney et al. |

(Continued)

FOREIGN PATENT DOCUMENTS

| CA | 2064682 | 4/1992 |
| CA | 2336077 | 1/2000 |

(Continued)

OTHER PUBLICATIONS

Hall, "Bridging Effectiveness of Perlite for Light Weight Cements and Lost Circulation", Petroleum Branch, AIME, Paper No. 141-G, Oct. 1951.

(Continued)

*Primary Examiner* — John J Figueroa
(74) *Attorney, Agent, or Firm* — Craig W. Roddy; Tumey L.L.P.

(57) ABSTRACT

Embodiments relate to systems and methods for introduction of fluids comprising kiln dust into a wellbore through a bottom hole assembly. An embodiment discloses a method comprising: drilling a wellbore in a subterranean formation using a bottom hole assembly; and pumping a treatment fluid into the wellbore through the bottom hole assembly, wherein the treatment fluid comprises a kiln dust and water.

14 Claims, 6 Drawing Sheets

Related U.S. Application Data continuation-in-part of application No. 13/535,145, filed on Jun. 27, 2012, now Pat. No. 8,505,629, which is a continuation-in-part of application No. 12/895,436, filed on Sep. 30, 2010, now Pat. No. 8,522,873, which is a continuation-in-part of application No. 12/264,010, filed on Nov. 3, 2008, now Pat. No. 8,333,240, which is a continuation-in-part of application No. 11/223,669, filed on Sep. 9, 2005, now Pat. No. 7,445,669.

(51) Int. Cl.

| | |
|---|---|
| C09K 8/42 | (2006.01) |
| C09K 8/473 | (2006.01) |
| C09K 8/48 | (2006.01) |
| C09K 8/487 | (2006.01) |
| E21B 33/13 | (2006.01) |
| C04B 111/00 | (2006.01) |

(56) References Cited

U.S. PATENT DOCUMENTS

| | | |
|---|---|---|
| 2,045,899 A | 6/1936 | Davis |
| 2,094,316 A | 9/1937 | Cross et al. |
| 2,133,622 A | 10/1938 | Larmour et al. |
| 2,144,254 A | 1/1939 | Breerwood |
| 2,193,775 A | 3/1940 | Stratford |
| 2,193,807 A | 3/1940 | Dieterich |
| 2,214,715 A | 9/1940 | Breerwood |
| 2,329,940 A | 9/1943 | Ponzer |
| 2,592,468 A | 4/1952 | Rex et al. |
| 2,772,739 A | 12/1956 | Arie |
| 2,842,205 A | 7/1958 | Allen et al. |
| 2,844,361 A | 7/1958 | Dilcher et al. |
| 2,848,051 A | 8/1958 | Willaims |
| 2,871,133 A | 1/1959 | Palonen et al. |
| 2,880,096 A | 3/1959 | Hurley |
| 2,945,769 A | 7/1960 | Gama et al. |
| 3,024,125 A | 3/1962 | Lee |
| 3,066,031 A | 11/1962 | Schifferle |
| 3,168,139 A | 2/1965 | Kennedy et al. |
| 3,320,077 A | 5/1967 | Prior |
| 3,407,193 A | 10/1968 | McColl et al. |
| 3,411,580 A | 11/1968 | Roberts et al. |
| 3,421,703 A | 1/1969 | Galer |
| 3,454,095 A | 7/1969 | Messenger et al. |
| 3,473,939 A | 10/1969 | Mayberry et al. |
| 3,499,491 A | 3/1970 | Wyant et al. |
| 3,557,876 A | 1/1971 | Tragesser |
| 3,574,113 A | 4/1971 | Shannon |
| 3,574,816 A | 4/1971 | Abbdellatif et al. |
| 3,628,973 A | 12/1971 | Greening et al. |
| 3,748,159 A | 7/1973 | George |
| 3,749,173 A | 7/1973 | Hill et al. |
| 3,863,718 A | 2/1975 | Bruist |
| 3,876,005 A | 4/1975 | Fincher et al. |
| 3,887,009 A | 6/1975 | Miller et al. |
| 3,887,385 A | 6/1975 | Quist et al. |
| 3,921,717 A | 11/1975 | Danjushevsky et al. |
| 3,959,007 A | 5/1976 | Pitt |
| 4,018,617 A | 4/1977 | Nicholson |
| 4,018,619 A | 4/1977 | Webster et al. |
| 4,031,184 A | 6/1977 | McCord |
| 4,036,301 A | 7/1977 | Powers et al. |
| 4,083,407 A | 4/1978 | Griffin et al. |
| 4,101,332 A | 7/1978 | Nicholson |
| 4,105,459 A | 8/1978 | Mehta |
| 4,141,843 A | 2/1979 | Watson |
| 4,160,674 A | 7/1979 | Sawyer |
| 4,176,720 A | 12/1979 | Wilson |
| 4,268,316 A | 5/1981 | Wills et al. |
| 4,274,881 A | 6/1981 | Langton |
| 4,304,300 A | 12/1981 | Watson |
| 4,333,764 A | 6/1982 | Richardson |
| 4,341,562 A | 7/1982 | Ahlbeck |
| RE31,190 E | 3/1983 | Detroit et al. |
| 4,400,474 A | 8/1983 | Copperthwaite et al. |
| 4,407,677 A | 10/1983 | Wills et al. |
| 4,423,781 A | 1/1984 | Thomas |
| 4,432,800 A | 2/1984 | Kneller et al. |
| 4,435,216 A | 3/1984 | Diehl et al. |
| 4,436,850 A | 3/1984 | Burdick et al. |
| 4,440,576 A | 4/1984 | Flannery et al. |
| 4,460,292 A | 7/1984 | Durham et al. |
| 4,462,835 A | 7/1984 | Car |
| 4,470,463 A | 9/1984 | Holland |
| 4,494,990 A | 1/1985 | Harris |
| 4,515,635 A | 5/1985 | Rao et al. |
| 4,519,452 A | 5/1985 | Tsao et al. |
| 4,555,269 A | 11/1985 | Rao et al. |
| 4,614,599 A | 9/1986 | Walker |
| 4,624,711 A | 11/1986 | Styron |
| 4,633,950 A | 1/1987 | Delhommer et al. |
| 4,676,317 A | 6/1987 | Fry et al. |
| 4,676,832 A | 6/1987 | Childs et al. |
| 4,741,782 A | 5/1988 | Styron |
| 4,784,223 A | 11/1988 | Worrall et al. |
| 4,829,107 A | 5/1989 | Kindt et al. |
| 4,883,125 A | 11/1989 | Wilson et al. |
| 4,941,536 A | 7/1990 | Brothers et al. |
| 4,992,102 A | 2/1991 | Barbour |
| 5,030,366 A | 7/1991 | Wilson et al. |
| 5,049,288 A | 9/1991 | Brothers et al. |
| 5,058,679 A | 10/1991 | Hale et al. |
| RE33,747 E | 11/1991 | Hartley et al. |
| 5,086,850 A | 2/1992 | Harris et al. |
| 5,113,943 A | 5/1992 | Wilson et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,183,505 A | 2/1993 | Spinney |
| 5,183,506 A | 2/1993 | Zhang |
| 5,213,160 A | 5/1993 | Nahm et al. |
| 5,215,585 A | 6/1993 | Luthra et al. |
| 5,238,064 A | 8/1993 | Dahl et al. |
| 5,252,128 A | 10/1993 | Gopalkrishnan |
| 5,266,111 A | 11/1993 | Barbour |
| 5,290,355 A | 3/1994 | Jakel et al. |
| 5,295,543 A | 3/1994 | Terry et al. |
| 5,305,831 A | 4/1994 | Nahm |
| 5,314,022 A | 5/1994 | Cowan et al. |
| 5,316,083 A | 5/1994 | Nahm et al. |
| 5,327,968 A | 7/1994 | Onan et al. |
| 5,337,824 A | 8/1994 | Cowan |
| 5,339,902 A | 8/1994 | Harris |
| 5,346,548 A | 9/1994 | Mehta |
| 5,352,288 A | 10/1994 | Mallow |
| 5,358,044 A | 10/1994 | Hale et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,382,290 A | 1/1995 | Nahm et al. |
| 5,383,521 A | 1/1995 | Onan et al. |
| 5,383,967 A | 1/1995 | Chase |
| 5,398,758 A | 3/1995 | Onan et al. |
| 5,417,759 A | 5/1995 | Huddleston |
| 5,421,409 A | 6/1995 | Muller et al. |
| 5,423,379 A | 6/1995 | Hale et al. |
| 5,430,235 A | 7/1995 | Hooykaas et al. |
| 5,439,056 A | 8/1995 | Cowan |
| 5,454,867 A | 10/1995 | Brothers et al. |
| 5,456,751 A | 10/1995 | Zandi et al. |
| 5,458,195 A | 10/1995 | Totten et al. |
| 5,464,060 A | 11/1995 | Hale et al. |
| 5,472,051 A | 12/1995 | Brothers |
| 5,476,144 A | 12/1995 | Nahm et al. |
| 5,478,391 A | 12/1995 | Babaev et al. |
| 5,484,019 A | 1/1996 | Griffith |

(56) References Cited

U.S. PATENT DOCUMENTS

| | | |
|---|---|---|
| 5,494,513 A | 2/1996 | Fu et al. |
| 5,499,677 A | 3/1996 | Cowan |
| 5,515,921 A | 5/1996 | Cowan et al. |
| 5,518,996 A | 5/1996 | Maroy et al. |
| 5,520,730 A | 5/1996 | Barbour |
| 5,529,123 A | 6/1996 | Carpenter et al. |
| 5,529,624 A | 6/1996 | Riegler |
| 5,536,311 A | 7/1996 | Rodrigues |
| 5,542,782 A | 8/1996 | Carter et al. |
| 5,554,352 A | 9/1996 | Jaques et al. |
| 5,569,324 A | 10/1996 | Totten et al. |
| 5,571,318 A | 11/1996 | Griffith et al. |
| 5,580,379 A | 12/1996 | Cowan |
| 5,584,926 A | 12/1996 | Borgholm et al. |
| 5,585,333 A | 12/1996 | Dahl et al. |
| 5,588,489 A | 12/1996 | Chatterji et al. |
| 5,626,665 A | 5/1997 | Barger et al. |
| 5,641,584 A | 6/1997 | Andersen et al. |
| 5,673,753 A | 10/1997 | Hale et al. |
| 5,681,384 A | 10/1997 | Liskowitz et al. |
| 5,688,844 A | 11/1997 | Chatterji et al. |
| 5,711,383 A | 1/1998 | Terry et al. |
| 5,716,910 A | 2/1998 | Totten et al. |
| 5,728,654 A | 3/1998 | Dobson et al. |
| 5,788,762 A | 8/1998 | Barger et al. |
| 5,789,352 A | 8/1998 | Carpenter |
| 5,795,924 A | 8/1998 | Chatterji et al. |
| 5,820,670 A | 10/1998 | Chatterji et al. |
| 5,851,960 A | 12/1998 | Totten et al. |
| 5,866,516 A | 2/1999 | Costin |
| 5,866,517 A | 2/1999 | Carpenter et al. |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,968,255 A | 10/1999 | Metha et al. |
| 5,988,279 A | 11/1999 | Udarbe et al. |
| 6,022,408 A | 2/2000 | Stokes et al. |
| 6,060,434 A | 5/2000 | Sweatman et al. |
| 6,060,535 A | 5/2000 | Villar et al. |
| 6,063,738 A | 5/2000 | Chatterji et al. |
| 6,098,711 A | 8/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,264,738 B1 | 7/2001 | Lorke et al. |
| 6,277,189 B1 | 8/2001 | Chugh |
| 6,312,515 B1 | 11/2001 | Barlet-Gouedard et al. |
| 6,315,042 B1 | 11/2001 | Griffith et al. |
| 6,328,106 B1 | 12/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,402,833 B1 | 6/2002 | O'Hearn et al. |
| 6,409,819 B1 | 6/2002 | Ko |
| 6,416,574 B1 | 7/2002 | Steelhammer et al. |
| 6,451,104 B2 | 9/2002 | Mehta |
| 6,457,524 B1 | 10/2002 | Roddy |
| 6,478,869 B2 | 11/2002 | Reddy et al. |
| 6,478,870 B2 | 11/2002 | Marko |
| 6,488,763 B2 | 12/2002 | Brothers et al. |
| 6,488,764 B2 | 12/2002 | Westerman |
| 6,494,951 B1 | 12/2002 | Reddy et al. |
| 6,500,252 B1 | 12/2002 | Chatterji et al. |
| 6,502,634 B1 | 1/2003 | Evans et al. |
| 6,508,305 B1 | 1/2003 | Brannon et al. |
| 6,516,884 B1 | 2/2003 | Chatterji et al. |
| 6,524,384 B2 | 2/2003 | Griffith et al. |
| 6,547,871 B2 | 4/2003 | Chatterji et al. |
| 6,547,891 B2 | 4/2003 | Linden et al. |
| 6,555,307 B2 | 4/2003 | Maruyama |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,610,139 B2 | 8/2003 | Reddy et al. |
| 6,626,243 B1 | 9/2003 | Go Boncan |
| 6,641,658 B1 | 11/2003 | Dubey |
| 6,645,289 B2 | 11/2003 | Sobolev et al. |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,927 B2 | 12/2003 | Chatterji et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,708,760 B1 | 3/2004 | Chatterji et al. |
| 6,715,568 B1 | 4/2004 | Bailey |
| 6,716,282 B2 | 4/2004 | Griffith et al. |
| 6,729,405 B2 | 5/2004 | DiLullo et al. |
| 6,749,679 B2 | 6/2004 | Shi |
| 6,755,905 B2 | 6/2004 | Oates |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,823,940 B2 | 11/2004 | Reddy et al. |
| 6,832,652 B1 | 12/2004 | Dillenbeck et al. |
| 6,835,243 B2 | 12/2004 | Brothers et al. |
| 6,837,316 B2 | 1/2005 | Reddy et al. |
| 6,840,318 B2 | 1/2005 | Lee |
| 6,840,996 B2 | 1/2005 | Morioka et al. |
| 6,846,357 B2 | 1/2005 | Reddy et al. |
| 6,848,519 B2 | 2/2005 | Reddy et al. |
| 6,869,474 B2 | 3/2005 | Perez-Pena |
| 6,869,475 B1 | 3/2005 | Krowl |
| 6,874,353 B2 | 4/2005 | Johnson |
| 6,874,578 B1 | 4/2005 | Garnier |
| 6,883,609 B2 | 4/2005 | Drochon |
| 6,887,833 B2 | 5/2005 | Brothers et al. |
| 6,889,767 B2 | 5/2005 | Reddy et al. |
| 6,899,177 B2 | 5/2005 | Chatterji et al. |
| 6,904,971 B2 | 6/2005 | Brothers et al. |
| 6,908,507 B2 | 6/2005 | Lalande et al. |
| 6,908,508 B2 | 6/2005 | Brothers |
| 6,911,078 B2 | 6/2005 | Barlet-Gouedard et al. |
| 6,964,302 B2 | 11/2005 | Luke et al. |
| 6,989,057 B2 | 1/2006 | Getzlaf et al. |
| 7,004,263 B2 | 2/2006 | Moriarty et al. |
| 7,022,755 B1 | 4/2006 | Chatterji et al. |
| 7,048,053 B2 | 5/2006 | Santra et al. |
| 7,055,603 B2 | 6/2006 | Caveny et al. |
| 7,073,584 B2 | 7/2006 | Reddy et al. |
| 7,073,585 B2 | 7/2006 | Morgan et al. |
| 7,077,203 B1 | 7/2006 | Roddy et al. |
| 7,096,944 B2 | 8/2006 | Vargo et al. |
| 7,101,829 B2 | 9/2006 | Guichard |
| 7,137,446 B2 | 11/2006 | Gagliano et al. |
| 7,140,439 B2 | 11/2006 | Luke et al. |
| 7,140,440 B2 | 11/2006 | Luke et al. |
| 7,143,827 B2 | 12/2006 | Chatterji et al. |
| 7,147,055 B2 | 12/2006 | Brothers et al. |
| 7,147,067 B2 | 12/2006 | Getzlaf et al. |
| 7,150,321 B2 | 12/2006 | Luke et al. |
| 7,174,962 B1 | 2/2007 | Roddy et al. |
| 7,182,137 B2 | 2/2007 | Fyten et al. |
| 7,198,104 B2 | 4/2007 | Griffith et al. |
| 7,199,086 B2 | 4/2007 | Roddy et al. |
| 7,204,307 B2 | 4/2007 | Roddy et al. |
| 7,204,310 B1 | 4/2007 | Roddy et al. |
| 7,213,646 B2 | 5/2007 | Roddy et al. |
| 7,217,441 B2 | 5/2007 | Bour et al. |
| 7,219,733 B2 | 5/2007 | Luke et al. |
| 7,255,739 B2 | 8/2007 | Brothers et al. |
| 7,284,609 B2 | 10/2007 | Roddy et al. |

(56) References Cited

U.S. PATENT DOCUMENTS

| | | |
|---|---|---|
| 7,284,930 B2 | 10/2007 | Shi et al. |
| 7,285,164 B2 | 10/2007 | Luke et al. |
| 7,285,166 B2 | 10/2007 | Luke et al. |
| 7,293,609 B2 | 11/2007 | Dealy et al. |
| 7,297,664 B2 | 11/2007 | Santra et al. |
| 7,303,008 B2 | 12/2007 | Badalamenti et al. |
| 7,316,744 B2 | 1/2008 | De La Roij et al. |
| 7,325,611 B2 | 2/2008 | Santra et al. |
| 7,335,252 B2 | 2/2008 | Roddy et al. |
| 7,337,842 B2 | 3/2008 | Roddy et al. |
| 7,338,923 B2 | 3/2008 | Roddy et al. |
| 7,341,104 B2 | 3/2008 | Roddy et al. |
| 7,341,105 B2 | 3/2008 | Bingamon et al. |
| 7,350,573 B2 | 4/2008 | Reddy |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,395,860 B2 | 7/2008 | Roddy et al. |
| 7,404,855 B2 | 7/2008 | Chatterji et al. |
| 7,409,990 B1 | 8/2008 | Burts et al. |
| 7,413,014 B2 | 8/2008 | Chatterji et al. |
| 7,442,249 B2 | 10/2008 | Mueller |
| 7,445,669 B2 | 11/2008 | Roddy et al. |
| 7,478,675 B2 | 1/2009 | Roddy et al. |
| 7,527,688 B2 | 5/2009 | Bingamon et al. |
| 7,544,640 B2 | 6/2009 | Luke et al. |
| 7,607,482 B2 | 10/2009 | Roddy et al. |
| 7,607,484 B2 | 10/2009 | Roddy et al. |
| 7,627,870 B1 | 12/2009 | Michaeli et al. |
| 7,631,692 B2 | 12/2009 | Roddy et al. |
| 7,651,563 B2 | 1/2010 | Datta et al. |
| 7,655,088 B2 | 2/2010 | Bethani |
| 7,658,796 B2 | 2/2010 | Nordmeyer |
| 7,674,332 B2 | 3/2010 | Roddy et al. |
| 7,708,071 B2 | 5/2010 | Roddy et al. |
| 7,712,527 B2 | 5/2010 | Roddy |
| 7,740,070 B2 | 6/2010 | Santra et al. |
| 7,741,841 B2 | 6/2010 | Edwards et al. |
| 7,743,828 B2 | 6/2010 | Roddy et al. |
| 7,748,454 B2 | 7/2010 | Roddy et al. |
| 7,757,766 B2 | 7/2010 | Lewis |
| 7,784,542 B2 | 8/2010 | Roddy et al. |
| 7,789,150 B2 | 9/2010 | Roddy et al. |
| 7,815,880 B2 | 10/2010 | Constantz et al. |
| 7,837,412 B2 | 11/2010 | O'Hearn |
| 7,867,954 B2 | 1/2011 | Warrender et al. |
| 7,887,694 B2 | 2/2011 | Constantz et al. |
| 7,919,064 B2 | 4/2011 | Kawatra et al. |
| 7,922,809 B1 | 4/2011 | Constantz et al. |
| 7,927,419 B2 | 4/2011 | Roddy |
| 7,938,201 B2 | 5/2011 | Giroux et al. |
| 7,939,336 B2 | 5/2011 | Constantz et al. |
| 7,963,323 B2 | 6/2011 | Bailey |
| 7,993,451 B2 | 8/2011 | Brouillette et al. |
| 8,006,446 B2 | 8/2011 | Constantz et al. |
| 8,029,618 B2 | 10/2011 | Al-Shafei |
| 8,030,253 B2 | 10/2011 | Roddy et al. |
| 8,039,253 B2 | 10/2011 | Asou |
| 8,062,999 B2 | 11/2011 | Reddy et al. |
| 8,143,198 B2 | 3/2012 | Lewis et al. |
| 8,162,055 B2 | 4/2012 | Lewis et al. |
| 8,186,457 B2 | 5/2012 | Boyle |
| 8,261,827 B2 | 9/2012 | Roddy |
| 8,281,859 B2 | 10/2012 | Roddy |
| 8,297,357 B2 | 10/2012 | Brenneis et al. |
| 8,307,899 B2 | 11/2012 | Brenneis et al. |
| 8,318,642 B2 | 11/2012 | Roddy |
| 8,324,137 B2 | 12/2012 | Roddy et al. |
| 8,327,939 B2 | 12/2012 | Roddy |
| 8,333,240 B2 | 12/2012 | Roddy et al. |
| 8,342,242 B2 | 1/2013 | Roddy et al. |
| 8,360,160 B2 | 1/2013 | Giroux et al. |
| 8,394,744 B2 | 3/2013 | Woytowich et al. |
| 8,399,387 B2 | 3/2013 | Roddy et al. |
| 8,403,045 B2 | 3/2013 | Brenneis |
| 8,434,553 B2 | 5/2013 | Brenneis et al. |
| 8,440,596 B2 | 5/2013 | Brenneis et al. |
| 8,470,275 B2 | 6/2013 | Constantz et al. |
| 8,486,868 B2 | 7/2013 | Brenneis et al. |
| 8,486,869 B2 | 7/2013 | Brenneis et al. |
| 8,505,629 B2 | 8/2013 | Benkley et al. |
| 8,505,630 B2 | 8/2013 | Chatterji et al. |
| 8,522,873 B2 | 9/2013 | Benkley |
| 8,540,025 B2 | 9/2013 | Reddy et al. |
| 8,544,543 B2 | 10/2013 | Chatterji et al. |
| 8,551,923 B1 | 10/2013 | Benkley et al. |
| 8,554,543 B2 | 10/2013 | Cherepanov et al. |
| 8,555,967 B2 | 10/2013 | Chatterji et al. |
| 8,586,508 B2 | 11/2013 | Reddy et al. |
| 8,586,512 B2 | 11/2013 | Roddy et al. |
| 8,598,093 B2 | 12/2013 | Roddy et al. |
| 8,603,951 B2 | 12/2013 | Perez |
| 8,609,595 B2 | 12/2013 | Morgan |
| 8,672,028 B2 | 3/2014 | Karcher et al. |
| 8,691,737 B2 | 4/2014 | Chatterji et al. |
| 2002/0117090 A1 | 8/2002 | Ku |
| 2003/0116887 A1 | 6/2003 | Scott |
| 2004/0149431 A1* | 8/2004 | Wylie et al. ............... 166/242.1 |
| 2004/0187740 A1 | 9/2004 | Timmons |
| 2006/0166834 A1 | 7/2006 | Roddy |
| 2007/0056479 A1 | 3/2007 | Gray |
| 2007/0056732 A1* | 3/2007 | Roddy et al. ............... 166/292 |
| 2007/0137528 A1 | 6/2007 | LeRoy-Delage et al. |
| 2008/0169130 A1 | 7/2008 | Norman |
| 2008/0229979 A1 | 9/2008 | Lewis |
| 2009/0124522 A1 | 5/2009 | Roddy et al. |
| 2010/0044057 A1 | 2/2010 | Dealy et al. |
| 2010/0196104 A1 | 8/2010 | Constantz et al. |
| 2010/0258035 A1 | 10/2010 | Constantz et al. |
| 2010/0294496 A1* | 11/2010 | Woytowich et al. .......... 166/285 |
| 2011/0000400 A1 | 1/2011 | Roddy |
| 2012/0145387 A1 | 6/2012 | Pyatina et al. |
| 2012/0152539 A1 | 6/2012 | Karcher |
| 2012/0193097 A1 | 8/2012 | Roddy et al. |
| 2012/0227631 A1 | 9/2012 | Roddy |
| 2012/0285682 A1 | 11/2012 | Santra et al. |
| 2012/0318506 A1 | 12/2012 | Benkley et al. |
| 2012/0325476 A1 | 12/2012 | Brenneis et al. |
| 2012/0328377 A1 | 12/2012 | Brenneis et al. |
| 2013/0008352 A1 | 1/2013 | Roddy et al. |
| 2013/0118752 A1 | 5/2013 | Hannegan et al. |
| 2013/0126159 A1 | 5/2013 | Bryan et al. |
| 2013/0153214 A1 | 6/2013 | Roddy et al. |
| 2013/0157903 A1 | 6/2013 | Benkley et al. |
| 2013/0210685 A1 | 8/2013 | Chatterji et al. |
| 2013/0213643 A1 | 8/2013 | Chatterji et al. |
| 2014/0048266 A1 | 2/2014 | Morgan et al. |
| 2014/0060389 A1 | 3/2014 | Chatterji et al. |
| 2014/0076204 A1 | 3/2014 | Brenneis et al. |
| 2014/0123879 A1 | 5/2014 | Karcher et al. |

FOREIGN PATENT DOCUMENTS

| | | |
|---|---|---|
| CA | 2153372 | 1/2006 |
| CA | 2736148 | 5/2012 |
| CN | 1054620 C | 11/1997 |
| CN | 1182062 | 5/1998 |
| CN | 97105827.X | 7/2000 |
| CN | 1443727 | 9/2003 |
| EP | 0752048 | 1/1997 |
| EP | 0814067 | 12/1997 |
| EP | 1092693 | 4/2001 |
| EP | 1236701 | 9/2002 |
| EP | 1394137 | 7/2003 |
| EP | 1348831 | 10/2003 |
| EP | 1900703 | 3/2008 |
| EP | 2075303 | 7/2009 |
| EP | 1853680 | 4/2010 |
| EP | 1769132 | 4/2011 |
| GB | 1469954 | 4/1997 |
| GB | 2455446 | 6/2009 |
| JP | 52117316 | 10/1977 |
| JP | 55027881 | 2/1990 |
| JP | 10110487 | 4/1998 |

(56) References Cited

FOREIGN PATENT DOCUMENTS

| | | |
|---|---|---|
| KR | 1126647 | 3/2012 |
| RU | 2026959 | 1/1995 |
| RU | 2003136028 | 5/2005 |
| SU | 1373781 | 2/1988 |
| WO | WO 83/01443 | 9/1982 |
| WO | WO 93/21122 | 10/1993 |
| WO | WO 97/21637 | 6/1997 |
| WO | WO 95/54108 | 12/1998 |
| WO | WO 98/54108 | 12/1998 |
| WO | WO 00/63134 | 1/2000 |
| WO | WO 03/031364 | 4/2003 |
| WO | WO 2004/101951 | 11/2004 |
| WO | WO 2004/101952 | 11/2004 |
| WO | WO 2005/047212 | 5/2005 |
| WO | WO 2005/061846 | 7/2005 |
| WO | WO 2006/032841 | 3/2006 |
| WO | WO 2007/028952 | 3/2007 |
| WO | WO 2007/041841 | 4/2007 |
| WO | WO 2007/048999 | 5/2007 |
| WO | WO 2007/128945 | 11/2007 |
| WO | WO 2009/071962 | 12/2007 |
| WO | 2009029800 | 3/2009 |
| WO | WO 2006/074946 | 6/2009 |
| WO | WO 2009/138747 | 11/2009 |
| WO | WO 2010/086592 | 8/2010 |
| WO | 2011051664 | 5/2011 |
| WO | WO 2012/001343 | 1/2012 |

OTHER PUBLICATIONS

Saunders, "Trend in Use of Low-weight Cement Slurries", Abstract, Mar. 1952.
Murphy, "A Critique of Filler Cements", Journal of Petroleum Technology, Aug. 1967.
Sugama, "Carbonation of Hydrothermally Treated Phosphate-Bonded Calcium Aluminate Cements", pp. 1-9, 1973.
Herndon, "Setting Downhole Plugs: A State-of-the-Art", Petroleum Engineer International, Apr. 1978.
Morgan, R.G., Suter, D.A., and Sweat, V.A., "Mathematical Analysis of a Simple Back Extrusion Rheometer," ASAE Paper No. 79-6001, Jun. 24, 1979.
"API Specification for Materials and Testing for Well Cements", API Spec. 10, 5th ed., pp. 7, 19-21, Jul. 1, 1980.
Sersale, "Portland—Zeolite-Cement for Minimizing Alkali-Aggregate Expansion", 1987.
Smith, "Cementing" Society of Professional Engineers, pp. 14, 38, 1987.
Nelson, "Well Cementing", 1990.
Smith, "Cementing" Society of Petroleum Engineers, p. 38, 1990.
"Appendix A", API RP 13B-2, 2d ed.; pp. 6-8, Dec. 1, 1991.
Sugama, "Carbonation of Hydrothermally Treated Phosphate Bonded Calcium Aluminate Cements," pp. 1-10, 1992.
Vinson, "Acid Removable Cement System Helps Lost Circulation in Productive Zones", IADC/SPE 23929, Feb. 18, 1992.
Marfil, "Zeolite Crystallization in Portland Cement Concrete Due to Alkali-Aggregate Reaction", 1993.
Atkins, "Zeolite P in Cements", "Its Potential for Immobilizing Toxic and Radioactive Waste Species", 1995.
Janotka, "The Properties of Mortar Using Blends With Portland Cement Clinker, Zeolite Tuff and Gypsum", 1995.
"Manufacture of supplementary cementitious materials from cement kiln dust", Mishulovich et al., World Cement Research and Development, p. 116-120, Mar. 1996.
Sugama, "Hot Alkali Carbonation of Sodium Metaphosphate Modified Fly Ash/Calcium Aluminate Blend Hydrothermal Cements", pp. 1661-1672, Sep. 11, 1996.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Naiqian, "Study on the Suppression Effect of Natural Zeolite on Expansion of Concrete Due to Alkali-Aggregate Reaction", 1998.
Chan, Comparative Study of the Initial Surface Absorption and Chloride Diffusion of High Performance Zeolite Silica Fume and PFA concretes, 1999.
Poon, "A Study of the Hydration of Natural Zeolite Blended Cement Pastes", 1999.
Ding, "Extreme Vertices Design of Concrete With Combined Mineral Admixtures", 1999.
Feng, "Zeolite Ceramiste Cellular Concrete", 2000.
Bartlet-Gouedard, "A Non-Conventional Way of Developing Cement Slurry for Geothermal Wells", 2001.
TXI Material Safety Data Sheet for Pressur-Seal, Oct. 2003.
"Kiln Dusts", Apr. 14, 2005.
"Beneficial use of Solid Waste in Maine", Apr. 14, 2005.
"Standards for the Management of Cement Kiln Dust Waste", Apr. 14, 2005.
"Use of Cement Kiln Dust for the Stabilization of Soils", R. L. Parsons, et al., Apr. 14, 2005.
"Alkali-activated binders by use of industrial by-products", Buchwald et al., Cement and concrete Research 35, p. 968-973, 2005.
Answer 3 of 24 Chemical Abstracts on STN "Effect of cement kiln dust substitution on chemical and physical properties and compressive strength of Portland and slag cements", Adb El-aleem et al. (abstract only), 2005.
Adaska and Taubert, "Beneficial Uses of Cement Kiln Dust", 2008 IEEE/PCA $50^{th}$ Cement Industry technical Conference, Miami, Fl, May 19-22, 2008, pp. 1-19, 2008.
"Fly Ash Resource Center-Pozzolan," available at http://www.rmajko.com/pozzolan.htm, Apr. 20, 2009.
Suyan, "An innovative Material for Severe Lost Circulation Control in Depleted Formations" SPE/IADC 125693, Oct. 2009.
The Schundler Company, "Perlite as an Ultra Fine Filler", Schundler Product Guide, http://www.schundler.com/filler.htm, 2010.
IP.com Electronic Publication, "Use of Cement Kiln Dust (CKD) in Low Temperature Cementing to Reduce Transition Times", Sep. 25, 2013.
HES Brochure "SCR-100 Cement Retarder A Valuable Time Saver", 1994.
HES Brochure "Halad-344 Fluid Loss Additive", 1998.
HES Brochure "HR-5 Cement Additive", 1998.
HES Brochure "AQF-2 Foaming Agent", 1999.
HES Brochure "ThermaLock™ Cement for Corrosive $CO_2$ Environments", 1999.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder", 1999.
HES Brochure "HR-4 Cement Retarder", 1999.
HES Brochure "HR-7 Cement Retarder", 1999.
HES Brochure "Pozmix A Cement Additive", 1999.
HES Brochure "Pozmix Cement and Pozmix 140", 1999.
HES Brochure "SCR-100™ Cement Retarder", 1999.
HES Brochure "SCR-500L High Temp Retarder", 2000.
HES Brochure "Halad-23 Fluid Loss Additive", 2000.
HES Brochure "Thermatek Service", May 2005.
HES Brochure "Tuned Spacer™ III", Apr. 2007.
HES Brochure "Cal-Seal 60™ Cement Accelerator", Aug. 2007.
HES Brochure "Cementing—Perlite Cement Additive", Aug. 2007.
HES Brochure "Econolite™ Additive for cement Slurries", Aug. 2007.
HES Brochure "Silicalite™", Aug. 2007.
HES Brochure "SSA-1™ Strenght-Stabilizing Agent", Aug. 2007.
HES Brochure "SSA-2™ Coarse Silica Flour", Aug. 2007.
HES Brochure "WG-17 LXP™ Free-Water Control Agent", Dec. 2007.
HES Brochure "HR®—601 Cement Retarder", Jan. 2008.
HES Brochure "Thermatek® RSP Rapid Set Plug Service", Mar. 2008.
HES Product Data Sheet "Baroid®", Mar. 25, 2010.
HES Brochure "Enhancer 923™ Cement Agent", Jun. 2010.

(56) References Cited

OTHER PUBLICATIONS

HES Brochure "Enhancer 923™ Agent—Successes from the Field", Jun. 2010.
HES Brochure "Latex 3000™ Cement Additive", Jun. 2010.
HES Brochure "Foamer 760™ foamer/Stabilizer", Aug. 2010.
HES Brochure "Tuned® Spacer IV", Aug. 2010.
HES Brochure "Tuned® Spacer V", Dec. 2010.
HES Brochure "D-Air 5000™ Defoamer", Aug. 2011.
HES Brochure "SA-1015™ Suspending Agent", Mar. 2012.
HES Brochure "WellLife® III Cementing Service", Jan. 2012.
HES Brochure "TergoVis1 efficiency fluid", Apr. 2013.
"3M Scotchlite, Glass Bubbles Floated Product Series Product Information", 1999.
BASF Technical Bulletin "MetaMax® PA", Aug. 2007.
HESS Pumice Products Inc., Fact Sheet for "DS-200", "DS-325", and "Ultrafine Grout", Aug. 2007.
LaFarge MSDS "Cement Kiln Dust", Mar. 3, 2005.
LaFarge MSDS "LaFarge Blended Cement (cement)", Mar. 3, 2005.
LaFarge brochure "TerraCem™", Aug. 2006.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431 (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.
Office Action from U.S. Appl. No. 11/223,669, Jun. 18, 2007.
Office Action from U.S. Appl. No. 11/257,261, Aug. 10, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/402,741, Oct. 24, 2007.
Office Action from U.S. Appl. No. 11/223,669, Jan. 29, 2008.
Office Action from U.S. Appl. No. 11/223,669, Apr. 8, 2008.
Office Action from U.S. Appl. No. 12/263,800, May 1, 2009.
Office Action from U.S. Appl. No. 12/283,398, Jul. 15, 2009.
Office Action from U.S. Appl. No. 12/263,800, Jul. 28, 2009.
Office Action from U.S. Appl. No. 12/420,630, Aug. 3, 2009.
Office Action from U.S. Appl. No. 12/349,676, Nov. 4, 2009.
Office Action from U.S. Appl. No. 12/606,381, Mar. 23, 2010.
Office Action from U.S. Appl. No. 12/609,993, Apr. 9, 2010.
Office Action from U.S. Appl. No. 12/609,993, Jun. 15, 2010.
Office Action from U.S. Appl. No. 12/558,097, Jun. 30, 2010.
Notice of Allowance from U.S. Appl. No. 12/609,993, Jul. 26, 2010.
Office Action from U.S. Appl. No. 12/558,097, Sep. 3, 2010.
Office Action from U.S. Appl. No. 12/833,189, Oct. 1, 2010.
Office Action from U.S. Appl. No. 12/844,612, Oct. 1, 2010.
Office Action from U.S. Appl. No. 12/364,998, Jan. 14, 2011.
Office Action from U.S. Appl. No. 12/844,612, Jan. 28, 2011.
Notice of Allowance from U.S. Appl. No. 12/544,915, Aug. 1, 2011.
Office Action from U.S. Appl. No. 12/844,612, Sep. 6, 2011.
Office Action from U.S. Appl. No. 12/264,010, Oct. 31, 2011.
Final Office Action from U.S. Appl. No. 12/844,612, Dec. 23, 2011.
Final Office Action from U.S. Appl. No. 12/264,010, Apr. 10, 2012.
Office Action from U.S. Appl. No. 12/844,612, Apr. 11, 2012.
Office Action from U.S. Appl. No. 13/399,913, May 15, 2012.
Office Action from U.S. Appl. No. 13/447,560, May 31, 2012.
Office Action from U.S. Appl. No. 12/821,412, Jun. 5, 2012.
Office Action from U.S. Appl. No. 12/825,004, Jun. 14, 2012.
Notice of Allowance from U.S. Appl. No. 13/447,560, Jun. 21, 2012.
Office action from U.S. Appl. No. 13/479,476, Jul. 2, 2012.
Office action from U.S. Appl. No. 12/975,196, Jul. 3, 2012.
Final Office Action from U.S. Appl. No. 12/844,612, Jul. 30, 2012.
Notice of Allowance from U.S. Appl. No. 13/399,913, Aug. 23, 2012.
Notice of Allowance from U.S. Appl. No. 13/535,258, Sep. 7, 2012.
Notice of Allowance from U.S. Appl. No. 12/825,004, Sep. 20, 2012.
Office Action from U.S. Appl. No. 13/477,777, Oct. 15, 2012.
Office Action from U.S. Appl. No. 13/560,406, Oct. 17, 2012.
Notice of Allowance from U.S. Appl. No. 12/844,612, Oct. 18, 2012.
Office Action from U.S. Appl. No. 13/555,624, Oct. 19, 2012.
Final Office Action from U.S. Appl. No. 12/975,196, Oct. 23, 2012.
Office Action from U.S. Appl. No. 13/431,701, Nov. 9, 2012.
Office Action from U.S. Appl. No. 13/620,163, Nov. 9, 2012.
Office Action from U.S. Appl. No. 13/606,098, Dec. 13, 2012.
Office Action from U.S. Appl. No. 13/669,149, Dec. 19, 2012.
Office Action from U.S. Appl. No. 13/620,013, Feb. 26, 2013.
Office Action from U.S. Appl. No. 13/725,833, Apr. 10, 2013.
Notice of Allowance from U.S. Appl. No. 13/669,149, May 13, 2013.
Notice of Allowance form U.S. Appl. No. 13/535,145, May 24, 2013.
Office Action from U.S. Appl. No. 13/620,013, May 28, 2013.
Notice of Allowance from U.S. Appl. No. 12/895,436, May 28, 2013.
Final Office Action from U.S. Appl. No. 13/477,777, May 29, 2013.
Notice of Allowance from U.S. Appl. No. 13/560,406, May 29, 2013.
Office Action from U.S. Appl. No. 13/851,925, Jun. 6, 2013.
Office Action from U.S. Appl. No. 13/889,398, Jun. 20, 2013.
Office Action from U.S. Appl. No. 13/851,391, Jul. 3, 2013.
Office Action from U.S. Appl. No. 13/872,063, Jul. 12, 2013.
Office Action from U.S. Appl. No. 13/767,710, Jul. 19, 2013.
Notice of Allowance from U.S. Appl. No. 13/851,391, Jul. 31, 2013.
Notice of Allowance from U.S. Appl. No. 13/889,398, Aug. 20, 2013.
Final Office Action from U.S. Appl. No. 13/477,777, Sep. 20, 2013.
Office Action from U.S. Appl. No. 13/767,710, Sep. 20, 2013.
Final Office Action from U.S. Appl. No. 13/851,925, Sep. 20, 2013.
Office Action from U.S. Appl. No. 13/180,238, Sep. 25, 2013.
Final Office Action from U.S. Appl. No. 13/620,013, Oct. 2, 2013.
Notice of Allowance from U.S. Appl. No. 13/662,111, Oct. 21, 2013.
Office Action form U.S. Appl. No. 13/955,516, Dec. 19, 2013.
Notice of Allowance from U.S. Appl. No. 13/180,238, Jan. 22, 2014.
Notice of Allowance from U.S. Appl. No. 13/851,925, Jan. 24, 2014.
Office Action form U.S. Appl. No. 13/851,475, Jan. 24, 2014.
Foreign Search Report from PCT/GB2005/001415, Sep. 9, 2005.
Foreign Search Report from PCT/GB2006/000406, Jul. 5, 2006.
Foreign Search Report from PCT/GB2006/003163, Oct. 27, 2006.
Foreign Search Report from PCT/GB2006/003160, Nov. 2, 2006.
Foreign Search Report from PCT/GB2006/003735, Dec. 1, 2006.
Foreign Search Report from PCT/GB2006/003694, Dec. 19, 2006.
Foreign Search Report from PCT/GB2006/000401, May 8, 2007.
Foreign Search Report from PCT/GB2009/000295, Feb. 3, 2009.
Foreign Search Report from PCT/GB2011/001749, Apr. 5, 2012.
EPO Application No. 06794648.3 Examination Report, Apr. 17, 2009.
EPO Application No. 06779194.7 Examination Report, May 29, 2009.
PCT International Search Report and Written Opinion for International Application No. PCT/GB2009/000295, Jul. 30, 2009.
PCT International Search Report and Written Opinion for International Application No. PCT/GB2009/002597, Feb. 1, 2010.
PCT International Search Report and Written Opinion for International Application No. PCT/GB2009/002598, Feb. 11, 2010.
PCT International Search Report and Written Opinion for International Application No. PCT/GB2010/000712, Jul. 26, 2010.
PCT International Search Report and Written Opinion for International Application No. PCT/GB2009/000295, Aug. 24, 2010.
PCT International Search Report and Written Opinion for International Application No. PCT/GB2010/001986, Jan. 19, 2011.
PCT International Search Report and Written Opinion for International Application No. PCT/GB2010/002011, Feb. 4, 2011.
PCT International Search Report and Written Opinion for International Application No. PCT/GB2009/002018, Mar. 24, 2011.

(56) References Cited

OTHER PUBLICATIONS

PCT International Search Report and Written Opinion for International Application No. PCT/GB2011/000933, Sep. 22, 2011.
PCT International Search Report and Written Opinion for International Application No. PCT/GB2011/001411, Jan. 27, 2012.
PCT International Search Report for International Application No. PCT/US2011/001749, Apr. 19, 2012.
PCT International Search Report and Written Opinion for International Application No. PCT/US2012/046117, Oct. 26, 2012.
PCT International Search Report and Written Opinion for International Application No. PCT/US2013/056719, Oct. 25, 2013.
PCT International Search Report and Written Opinion for International Application No. PCT/US2013/048092, Nov. 13, 2013.
Foreign Office Action for Canadian Patent Application No. 2621835, Oct. 2, 2009.
Foreign Office Action for Canadian Patent Application No. 2621832, Oct. 5, 2009.
Foreign Office Action for Canadian Patent Application No. 2650630, Oct. 14, 2010.
Foreign Office Action for Canadian Patent Application No. 2658155, Nov. 16, 2010.
Foreign Office Action for CN Application No. 200680042004.X, May 12, 2010, Translation only.].
Foreign Office Action for EP Application No. 06 764 648.3, Apr. 17, 2009.
Foreign Office Action for EP Application No. 06 779 194.7, May 29, 2009.
Foreign Office Action for EP Application No. 06 779 199.6, Mar. 1, 2010.
Foreign Office Action for EP Application No. 06 779 191.3, Mar. 31, 2010.
Foreign Office Action for EP Application No. 06 779 194.7, Jul. 2, 2010.
Foreign Office Action for EP Application No. 06 794 646.7, Sep. 24, 2010.
Foreign Office Action for EP Application No. 09 713 469.6, Sep. 28, 2010.
English language translation of Foreign Office Action for Chinese Application No. 200680042014.3, Dec. 1, 2010.
U.S. Appl. No. 13/622,821, first named inventor Brenneis et. al., filed Sep. 19, 2012.
USPTO Office Action for U.S. Appl. No. 13/620,013 dated Jan. 30, 2014.
USPTO Office Action for U.S. Appl. No. 14/079,421 dated Jan. 30, 2014.
International Search Report for International Application No. PCT/US2013/057213 dated Nov. 18, 2013.
USPTO Office Action for U.S. Appl. No. 13/595,493 dated Jul. 23, 2014.
Chinese Patent Application No. 200680042004.X dated Apr. 30, 2014 and translation.
The Professional Standard of the People's Republic of China, Rotary Kiln Dust Added to Cement, ZB Q 12001-84, dated Oct. 25, 1994 and translation.
Reexamination of Chinese Patent Application 200680042014.3 and translation.
Toshinori Kojima et al., Reduction of CO2 Emission from Cement Manufacturing Process by Partly Substituting Silicate for Limestone, Greenhouse Gas Control Technologies, pp. 933-938, dated 1999.
Fontenot et al., "Using Casing to Drill Directional Wells," Oilfield Review, Summer 2005, vol. 17, No. 2, pp. 44-61.
PCT International Search Report and the Written Opinion of the International Searching Authority for Application No. PCT/US2014/037538 dated Feb. 9, 2015.

* cited by examiner

PLACING A FLUID COMPRISING KILN DUST IN A WELLBORE THROUGH A BOTTOM HOLE ASSEMBLY

CROSS-REFERENCE TO RELATED APPLICATIONS

This application is a continuation-in-part of U.S. patent application Ser. No. 13/851,925, filed Mar. 27, 2013, which is a divisional application of U.S. patent application Ser. No. 13/725,833, filed Dec. 21, 2012, issued as U.S. Pat. No. 8,505,630 on Aug. 13, 2013, which is a continuation-in-part of U.S. application Ser. No. 13/535,145, filed Jun. 27, 2012, issued as U.S. Pat. No. 8,505,629 on Aug. 13, 2013, which is a continuation-in-part of U.S. application Ser. No. 12/895,436, filed Sep. 30, 2010, issued as U.S. Pat. No. 8,522,872 on Sep. 3, 2013, which is a continuation-in-part of U.S. application Ser. No. 12/264,010, filed Nov. 3, 2008, issued as U.S. Pat. No. 8,333,240 on Dec. 18, 2012, which is a continuation-in-part of U.S. application Ser. No. 11/223,669, filed Sep. 9, 2005, issued as U.S. Pat. No. 7,445,669 on Nov. 4, 2008, the entire disclosures of which are incorporated herein by reference.

BACKGROUND

Embodiments relate to subterranean operations and, in some embodiments, to introduction of fluids comprising kiln dust into a wellbore through a bottom hole assembly.

Wells are generally drilled into the ground to recover natural deposits of hydrocarbons and other desirable materials trapped in geological formations in the Earth's crust. Wells may be drilled by rotating a drill bit which is located on a bottom hole assembly at a distal end of a drill string. In conventional drilling, a wellbore is drilled to a desired depth and then the wellbore is lined with a larger-diameter pipe, typically referred to as a casing. Prior to inserting the casing and cementing it in place, the drill string and drill bit are removed from the wellbore. After the casing has been cemented in place, drilling is continued. In some instances, a technique referred to as "casing drilling" is used in which a casing is used in place of a drilling string. Similar to a drill string, the drill bit is connected to a distal end of the casing, and the casing is used to transmit rotational and axial forces to the drill bit. When the wellbore has been drilled to a desired depth, the casing may be cemented in place. In some instances, cement compositions and associated spacer fluids used in the cementing operation are placed into the wellbore through the bottom hole assembly. Casing drilling enables the well to be drilled and cased without the delays associated with removal of the drill bit and drill string from the wellbore.

A number of different fluids may be used in drilling and casing the wellbore. For instance, a drilling fluid may be pumped down through the drill string (or casing), out through the drill bit, and returned to the surface in the annulus between the drill string and the wellbore wall. The drilling fluid can act to lubricate and cool the drill bit as well as carry drill cuttings back to the surface. Spacer fluids can also be used in these operations. For instance, a spacer fluid may be used to displace drilling fluids from the wellbore before introduction of another fluid, such as a cement composition. Cement compositions may be used to cement the casing in the wellbore. The cement composition may be allowed to set in the annulus between the casing and the wellbore wall, thereby forming an annular sheath of hardened cement (e.g., a cement sheath) that should support and position the pipe string in the wellbore and bond the exterior surface of the pipe string to the walls of the wellbore. While a variety of different fluids have been used with some success in drilling and casing wellbore, improved fluids and techniques for their placement are needed in subterranean operations.

BRIEF DESCRIPTION OF THE DRAWINGS

These drawings illustrate certain aspects of some of the embodiments and should not be used to limit or define the invention.

DESCRIPTION OF PREFERRED EMBODIMENTS

Embodiments relate to subterranean operations and, in some embodiments, to introduction of a treatment fluid comprising kiln dust into a wellbore through a bottom hole assembly. In particular embodiments, the bottom hole assembly may be attached to a tubular, such as a drill pipe and/or a casing. By way of example, the treatment fluid may be used in a casing drilling operation, wherein the treatment fluid may be introduced into a wellbore through a bottom hole assembly that is attached to a distal end of a casing. In some embodiments, the treatment fluid may be introduced through a drill bit at a distal end of the bottom hole assembly. The term "treatment fluid" does not imply any particular action by the fluid or any component thereof. Treatment fluids may be used, for example, for drilling, completion, production, work over, or in any way to prepare a wellbore and/or well equipment for recovery of materials residing in a subterranean formation penetrated by the wellbore.

Figure 1:
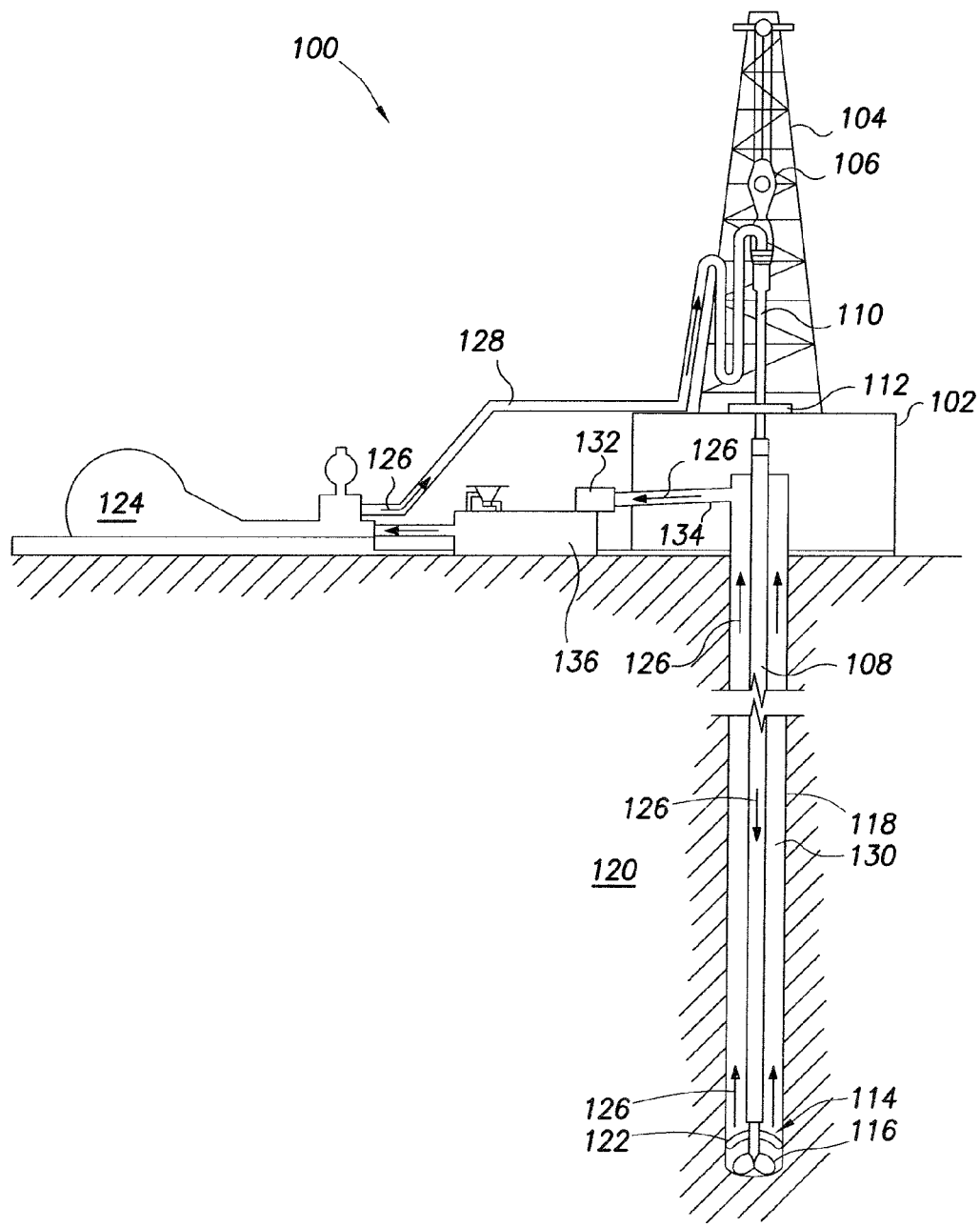
FIG. 1 is a schematic view of an example system that may be used for casing while drilling in accordance with various embodiments.

Referring now to FIG. 1, a casing drilling system 100 is shown in accordance with various embodiments. As illustrated, the casing drilling system 100 may include a drilling platform 102 that supports a derrick 104 having a traveling block 106 for raising and lowering a casing 108. The casing 108 may be generally tubular and comprise a string of tubulars, which may include conductor casing, surface casing, intermediate casing, production casing, or a production liner. Casing collars or other suitable connectors may be used to couple joints of tubulars to form the casing 108. In some embodiments, completion equipment may be attached to the casing 108. The individual components of the casing 108 are not shown on FIG. 1. In the casing drilling operation, the casing 108 is generally a larger diameter tubular than would typically be used for drilling. A kelly 110 may support the casing 108 as it is lowered through a rotary table 112. A bottom hole assembly 114 may be coupled to the distal end of the casing 108. The bottom hole assembly 114 may be a retrievable or non-retrievable bottom hole assembly. The bottom hole assembly 114 may include a drill bit 116 on its distal end and may be driven either by a downhole motor and/or via rotation of the casing 108 from the well surface. As the drill bit 116 rotates, it creates a wellbore 118 that penetrates various subterranean formations 120. In the illustrated embodiment, the bottom hole assembly 114 further includes an underreamer 122, which may be used to enlarge the wellbore 118 beyond the diameter of the drill bit 116, for example. In some embodiments, the underreamer 122 may be incorporated into the drill bit 116, incorporated with a lower end of the casing 108, or be a separate component attached to the drill bit 116. It should be noted that while FIG. 1 generally depicts a casing drilling system 100 being land based, those skilled in the art will readily recognize that the principles described herein are equally applicable to subsea drilling operations that employ floating or sea-based platforms and rigs, without departing from the scope of the disclosure.

A pump 124 (e.g., a mud pump) may circulate the drilling fluid 126 through a feed pipe 128 and to the kelly 110, which conveys the drilling fluid 126 downhole through the interior of the casing 108 and through one or more orifices in the drill bit 116. The drilling fluid 126 may then be circulated back to the surface via an annulus 130 defined between the casing 108 and the walls of the wellbore 118. At the surface, the recirculated or spent drilling fluid 126 exits the annulus 130 and may be conveyed to one or more fluid processing unit(s) 132 via an interconnecting flow line 134. After passing through the fluid processing unit(s) 132, a "cleaned" drilling fluid 126 may be deposited into a nearby retention pit 136 (e.g., a mud pit). While illustrated as being arranged at the outlet of the wellbore 118 via the annulus 130, those skilled in the art will readily appreciate that the fluid processing unit(s) 132 may be arranged at any other location in the casing drilling system 100 to facilitate its proper function, without departing from the scope of the scope of the disclosure.

Figure 2:
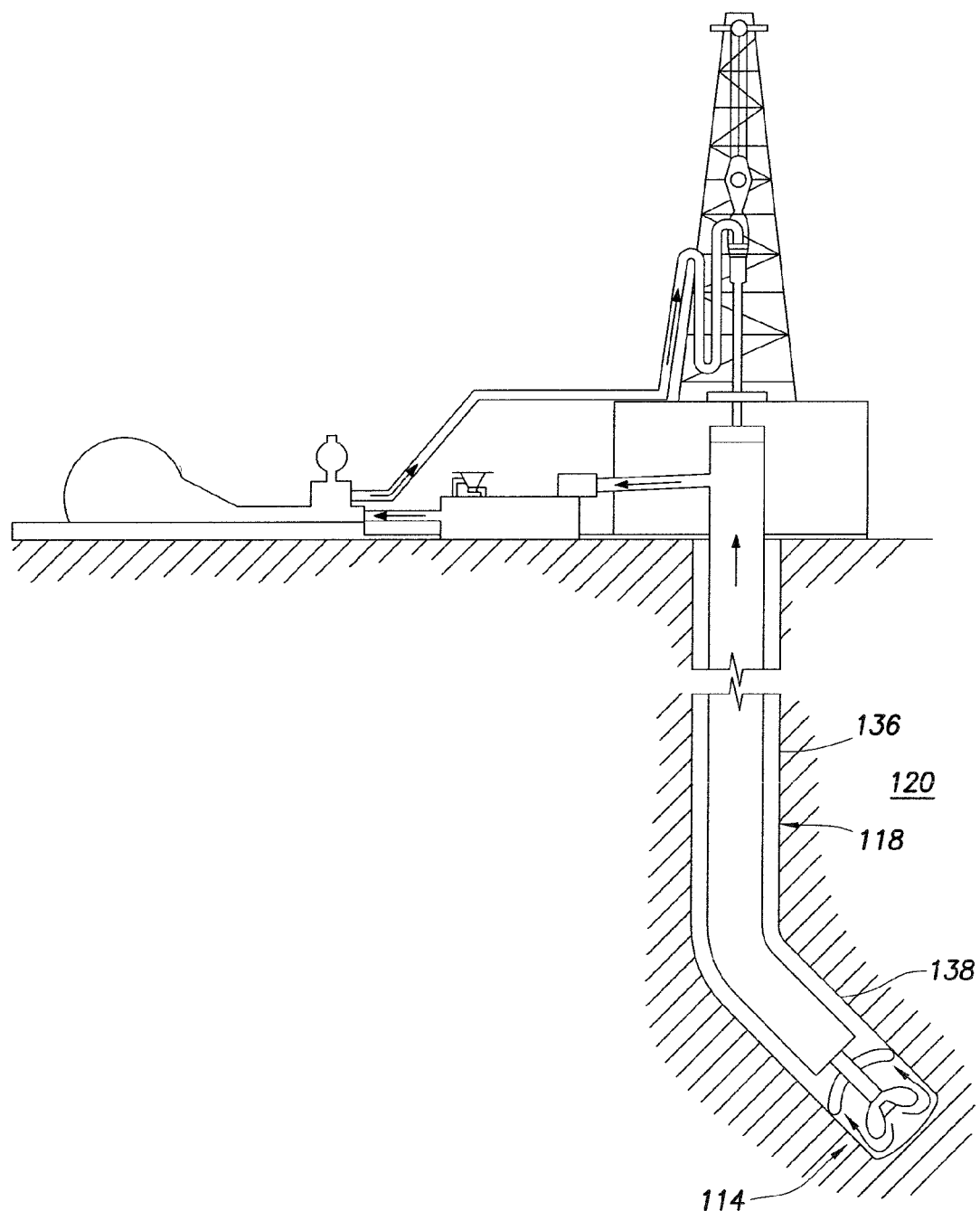
FIG. 2 is a schematic view of an example system that may be used for casing while directional drilling in accordance with various embodiments.

Referring now to FIG. 2, embodiments may include directional casing drilling. Directional drilling generally refers to the intentional deviation of the wellbore 118. Directional drilling may enable horizontal drilling through one or more subterranean formations 120. As illustrated by FIG. 2, directional casing drilling may be used to create wellbore 118 having a vertical upper section 136 and a slanted lower section 138. Any suitable technique may be used for creation of the slanted lower section 138 that is non-vertical. In some embodiments, the bottom hole assembly 114 used in directional casing drilling may be a rotatory steerable system that allows directional control while rotating.

Figure 3:
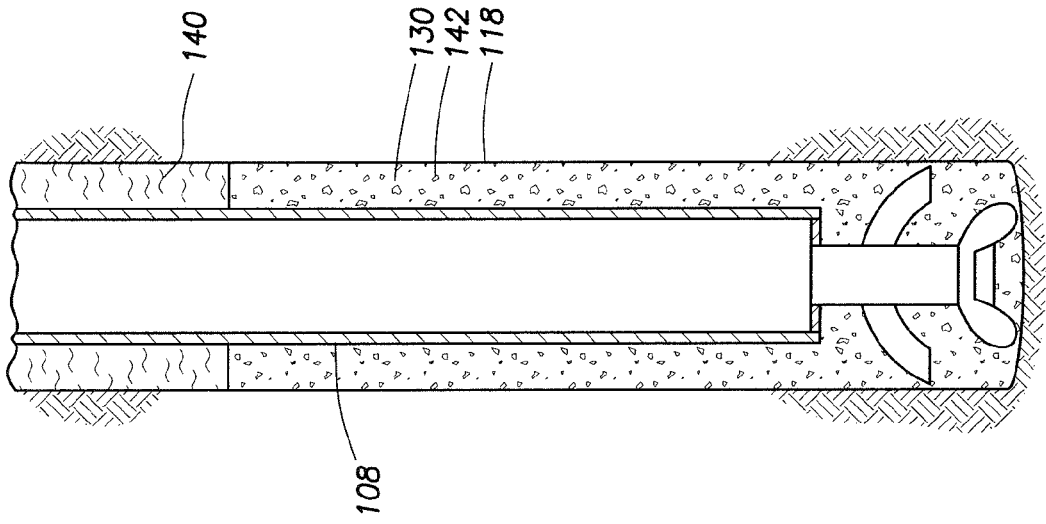
FIGS. 3 and 4 are schematic views showing displacement of the drilling fluid with placement of the spacer fluid and cement composition through a bottom hole assembly in accordance with various embodiments.

With reference now to FIG. 3, the drilling fluid 126 may be displaced from the wellbore 118 by a spacer fluid 140 in accordance with certain embodiments. In some embodiments, the spacer fluid 140 may be a treatment fluid comprising kiln dust and water. The spacer fluid 140 may also remove the drilling fluid, dehydrated/gelled drilling fluid, and/or filter cake solids from the wellbore 118 in advance of the cement composition 142. Embodiments of the spacer fluid 140 may improve the efficiency of the removal of these and other compositions from the wellbore 118. Removal of these compositions from the wellbore 118 may enhance bonding of the cement composition 142 to surfaces in the wellbore 118. In particular embodiments, the spacer fluid 140 comprising kiln dust and water may be characterized by having a higher yield point than the drilling fluid 126 at 80° F. In further embodiments, the spacer fluid 140 comprising kiln dust and water may be characterized by having a higher yield point than the drilling fluid 126 at 130° F. In yet further embodiments, the spacer fluid 140 comprising kiln dust and water may be characterized by having a higher yield point than the drilling fluid 126 at 180° F.

The spacer fluid 140 may be pumped down through the casing 108, out through the bottom hole assembly 114, and into the annulus 130. In some embodiments, the spacer fluid 140 may be introduced into the annulus 130 through the drill bit 116 on the bottom hole assembly 114. As illustrated, the spacer fluid 140 may also separate the drilling fluid 126 from a cement composition 142. The cement composition 142 may be introduced into the wellbore 118 behind the spacer fluid 140 to cement the casing 108 into the wellbore 118. The cement composition 142 may also be pumped down through the casing 108, out through the bottom hole assembly 114, and into the annulus 130. In some embodiments, the cement composition 142 may be a treatment fluid that comprises kiln dust and water. In some embodiments, both the spacer fluid 140 and the cement composition 142 may comprise kiln dust. In alternative embodiments, either the spacer fluid 140 or cement composition 142 may comprise kiln dust. In an additional embodiment, at least a portion of used and/or unused kiln dust containing spacer fluid 140 may be included in the cement composition 142 that is placed into the wellbore 118 and allowed to set. As will be described in more detail below the spacer fluid 140 and/or cement composition 142 comprising kiln dust may also comprise one or more additional additives in various concentrations and combinations.

Figure 4:
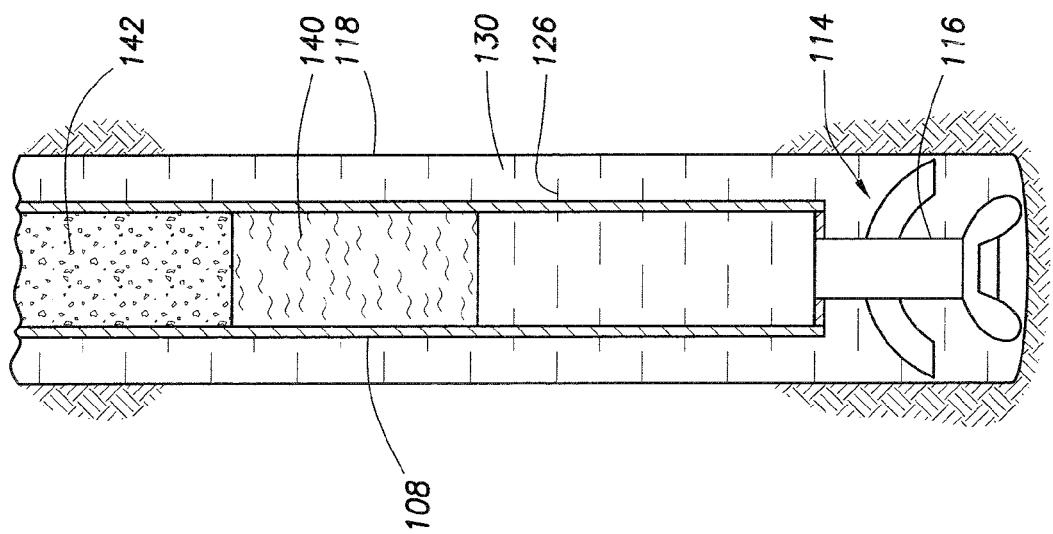

Referring now to FIG. 4, the wellbore 118 is shown after displacement of the drilling fluid 126 in accordance with various embodiments. As illustrated, the spacer fluid 140 and cement composition 142 may be disposed in the annulus 130 between the casing 108 and walls of the wellbore 118. The cement composition 142 may be allowed to consolidate in the annulus 130. More particularly, the cement composition may be allowed to set in the annulus 130 to form in an annular sheath of hardened cement. The annular sheath may form a barrier that prevents the migration of fluids in the wellbore 118. The annular sheath may also, for example, support the casing 108 in the wellbore 118. In some embodiments, at least a portion of the spacer fluid 142 may also remain in the annulus 130. The remaining portion of the spacer fluid 142 may consolidate in the annulus 130. For example, the spacer fluid may set and harden to gain compressive strength by reaction of the kiln dust in the water. The spacer fluid 142 after consolidation may prevent the migration of fluids in the wellbore 118 and also support the casing 108 in the wellbore 118.

Figure 5:
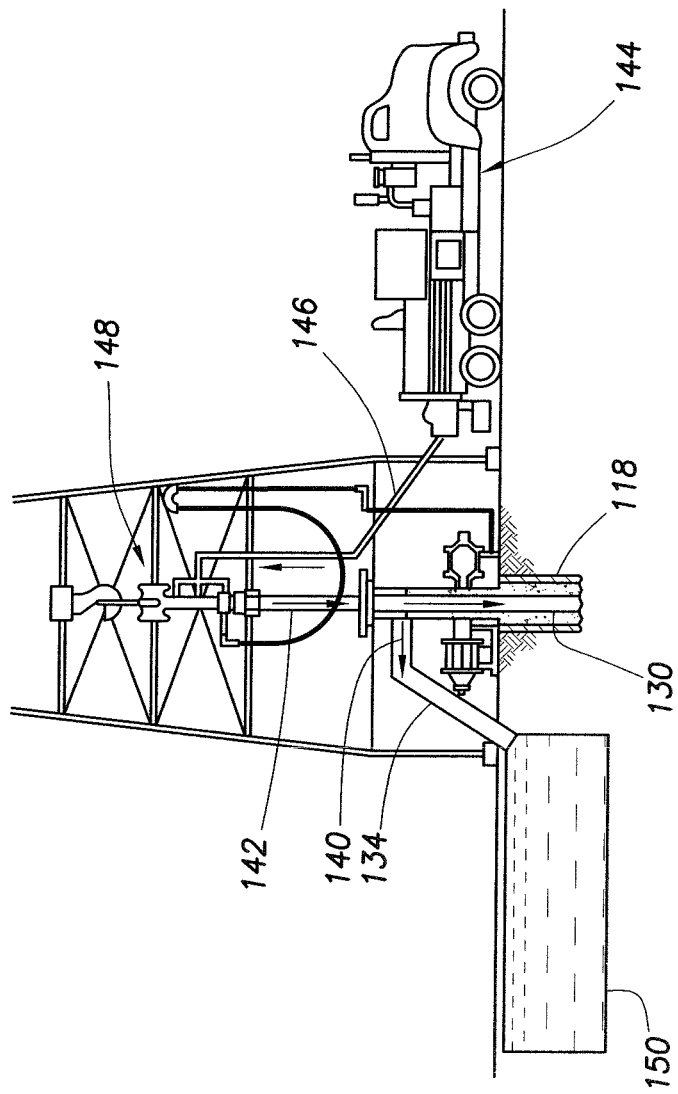
FIG. 5 is a schematic view showing equipment for placement of a cement composition into a wellbore in accordance with various embodiments.
Figure 6:
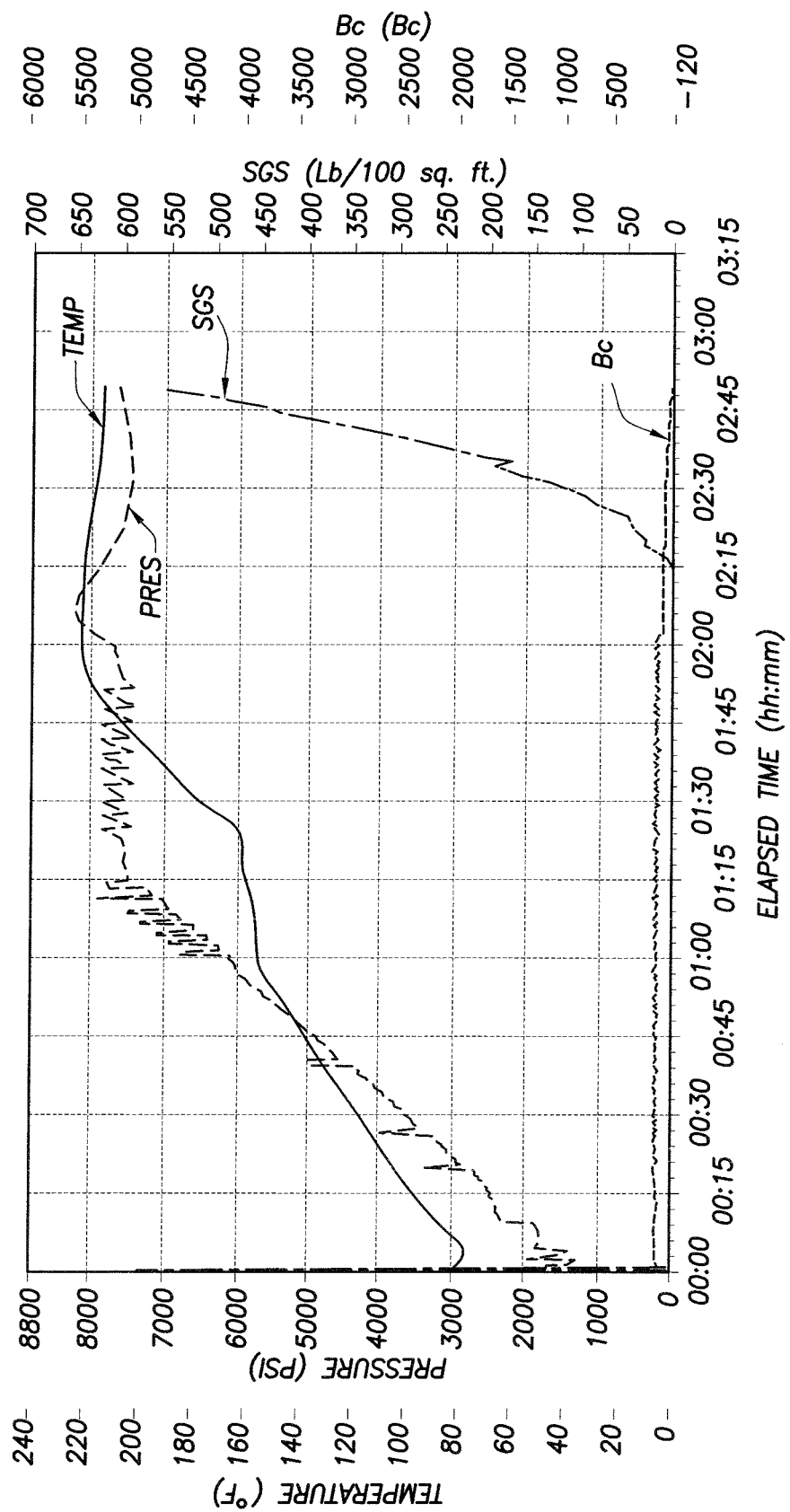
FIG. 6 is a graph showing measured static gel strength values at various temperature and pressure readings as a factor of time for an example treatment fluid.
Figure 7:
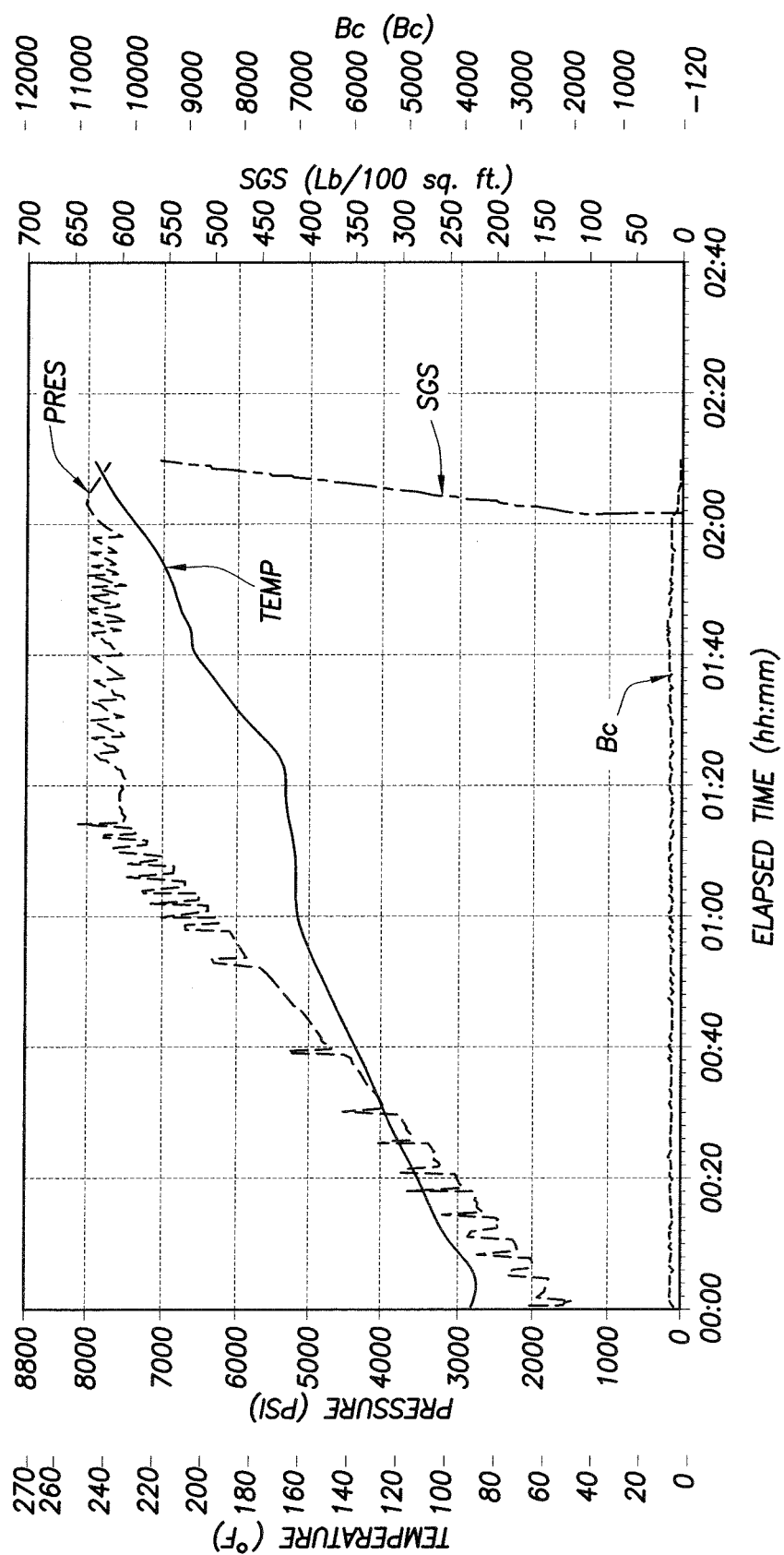
FIG. 7 is a graph showing measured static gel strength values at various temperature and pressure readings as a factor of time for an example treatment fluid.

Referring now to FIG. 5, a cementing unit 144 is shown that may be used in the placement of the cement composition 142 into the wellbore 118 in accordance with certain embodiments. While not shown, the cementing unit 144 may also be used in placement of the spacer fluid 140 into the wellbore 118. As will be apparent to those of ordinary skill in the art, the cementing unit 144 may include mixing equipment, such jet mixers, re-circulating mixers, or batch mixers. In some embodiments, a jet mixer may be used, for example, to continuously mix the components of the spacer fluid 140 and/or the cement composition 142 as it is being pumped to the wellbore 118. In some embodiments, the cementing unit 144 may include one or more cement trucks, which include mixing and pumping equipment. As illustrated, the cementing unit 144 may pump the cement composition 142 through a feed pipe 146 and to a cementing head 148 which conveys the cement composition 142 into the wellbore 118. As further illustrated, fluids (e.g., the spacer fluid 140) returned to the surface in the annulus 130 may deposited, for example, in the spacer retention pit 150 via the flow line 134.

The exemplary treatment fluids disclosed herein may directly or indirectly affect one or more components or pieces of equipment associated with the preparation, delivery, recapture, recycling, reuse, and/or disposal of the disclosed treatment fluids. For example, the disclosed treatment fluids may directly or indirectly affect one or more mixers, related mixing equipment, mud pits (e.g., retention pit 136, spacer retention pit 150), storage facilities or units, composition separators, heat exchangers, sensors, gauges, pumps, compressors, and the like used generate, store, monitor, regulate, and/or recondition the exemplary treatment fluids. The disclosed treatment fluids may also directly or indirectly affect any transport or delivery equipment used to convey the treatment fluids to a well site or downhole such as, for example, any transport vessels, conduits, pipelines, trucks, tubulars, and/or pipes used to compositionally move the treatment fluids from one location to another, any pumps, compressors, or motors (e.g., topside or downhole) used to drive the treatment fluids into motion, any valves or related joints used to regulate the pressure or flow rate of the treatment fluids, and any sensors (i.e., pressure and temperature), gauges, and/or combinations thereof, and the like. The disclosed treatment fluids may also directly or indirectly affect the various downhole equipment and tools that may come into contact with the treatment fluids such as, but not limited to, wellbore casing (e.g., casing 108), wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits (e.g., drill bit 116) and reamers, sensors or distributed sensors, downhole heat exchangers, valves and corresponding actuation devices, tool seals, packers, cement plugs, bridge plugs, and other wellbore isolation devices, or components, and the like.

Embodiments of the treatment fluids (e.g., spacer fluid 140, cement composition 142) may comprise kiln dust and water. In some embodiments, the treatment fluids may consolidate when left in a wellbore. For example, the treatment fluids may set and harden to gain compressive strength by reaction of the kiln dust in the water. In some embodiments, the treatment fluids may be foamed. For example, the foamed treatment fluids may comprise water, kiln dust, a foaming agent, and a gas. A foamed treatment fluid may be used, for example, where it is desired for the fluid to be lightweight and not exert excessive force on subterranean formations 120 penetrated by the wellbore 118. Embodiments of the treatment fluids may further comprise fly ash, barite, pumicite, a free water control additive, or a combination thereof. In accordance with present embodiments, the treatment fluid may be a spacer fluid 140 that displaces a first fluid (e.g., a drilling fluid 126) from the wellbore 118. In some embodiments, the spacer fluid 140 may have a higher yield point than the first fluid. In further embodiments, the treatment fluid may be a cement composition 142 that is used in cementing the casing 108 in the wellbore 118. Embodiment may further comprise using a treatment fluid comprising the kiln dust in drilling the wellbore 118. For example, the treatment fluid may be circulated past the drill bit 116 to carry drill cuttings back to the surface.

The treatment fluids generally should have a density suitable for a particular application as desired by those of ordinary skill in the art, with the benefit of this disclosure. In some embodiments, the treatment fluids may have a density in the range of from about 4 pounds per gallon ("ppg") to about 24 ppg. In other embodiments, the treatment fluids may have a density in the range of about 4 ppg to about 17 ppg. In yet other embodiments, the treatment fluids may have a density in the range of about 8 ppg to about 13 ppg. Embodiments of the treatment fluids may be foamed or unfoamed or comprise other means to reduce their densities known in the art, such as lightweight additives. Those of ordinary skill in the art, with the benefit of this disclosure, should recognize the appropriate density for a particular application.

Kiln dust, as that term is used herein, refers to a solid material generated as a by-product of the heating of certain materials in kilns. The term "kiln dust" as used herein is intended to include kiln dust made as described herein and equivalent forms of kiln dust. Kiln dust typically exhibits cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. Disposal of the cement kiln dust can add undesirable costs to the manufacture of the cement, as well as the environmental concerns associated with its disposal. The chemical analysis of the cement kiln dust from various cement manufactures varies depending on a number of factors, including the particular kiln feed, the efficiencies of the cement production operation, and the associated dust collection systems. Cement kin dust generally may comprise a variety of oxides, such as $SiO_2$, $Al_2O_3$, $Fe_2O_3$, $CaO$, $MgO$, $SO_3$, $Na_2O$, and $K_2O$. Problems may also be associated with the disposal of lime kiln dust, which may be generated as a by-product of the calcination of lime. The chemical analysis of lime kiln dust from various lime manufacturers varies depending on a number of factors, including the particular limestone or dolomitic limestone feed, the type of kiln, the mode of operation of the kiln, the efficiencies of the lime production operation, and the associated dust collection systems. Lime kiln dust generally may comprise varying amounts of free lime and free magnesium, lime stone, and/or dolomitic limestone and a variety of oxides, such as $SiO_2$, $Al_2O_3$, $Fe_2O_3$, $CaO$, $MgO$, $SO_3$, $Na_2O$, and $K_2O$, and other components, such as chlorides.

The kiln dust may be included in embodiments of the treatment fluids as a rheology modifier. Among other things, using the kiln dust in various embodiments can provide treatment fluids having rheology suitable for a particular application. Desirable rheology may be advantageous to provide a treatment fluid that is effective for drilling fluid displacement, for example, in spacer fluid embodiments. In some instances, the kiln dust can be used to provide a treatment fluid with a low degree of thermal thinning. For example, the treatment fluid may even have a yield point that increases at elevated temperatures, such as those encountered downhole.

The kiln dust may be included in the spacer fluids in an amount sufficient to provide, for example, the desired rheological properties. The concentration of kiln dust may also be selected to provide a low cost replacement for higher cost additives, such as Portland cement, that may typically be included in a particular treatment fluid. In some embodiments, the kiln dust may be present in a treatment fluid in an amount in the range of from about 1% to about 65% by weight of the treatment fluid (e.g., about 1%, about 5%, about 10%, about 15%, about 20%, about 25%, about 30%, about 35%, about 40%, about 45%, about 50%, about 55%, about 60%, about 65%, etc.). In some embodiments, the kiln dust may be present in the treatment fluid in an amount in the range of from about 5% to about 60% by weight of the treatment fluid. In some embodiments, the kiln dust may be present in an amount in the range of from about 20% to about 35% by weight of the treatment fluid. Alternatively, the amount of kiln dust may be expressed by weight of cementitious components ("bwocc"). As used herein, the term "by weight of cementitious components" or "bwocc" refers to the amount of a component, such as kiln dust, relative to the overall amount of cementitious components used in preparation of the treatment fluid. Cementitious components include those components or combinations of components of the treatment fluid that set, or otherwise harden, to develop compressive strength, including, for example, kiln dust, hydraulic cement, fly ash, hydrated lime, and the like. For example, the kiln dust may be present in an amount in a range of from about 1% to 100% bwocc. (e.g., about 1%, about 5%, about 10%, about 20%, about 30%, about 40%, about 50%, about 60%, about 70%, about 80%, about 90%, 100%, etc.). In some embodiments, the kiln dust may be present in an amount in the range of from about 50% to 100% and, alternatively, from about 80% to 100% bwocc. One of ordinary skill in the art, with the benefit of this disclosure, should recognize the appropriate amount of kiln dust to include for a chosen application.

The water used in an embodiment of the treatment fluids may include, for example, freshwater, saltwater (e.g., water containing one or more salts dissolved therein), brine (e.g., saturated saltwater produced from a subterranean formations), seawater, or any combination thereof. Generally, the water may be from any source, provided that the water does not contain an excess of compounds that may undesirably affect other components in the treatment fluid. The water may be included in an amount sufficient to form a pumpable fluid. In some embodiments, the water may be included in the treatment fluids in an amount in a range of from about 40% to about 200% bwocc. In some embodiments, the water may be included in an amount in a range of from about 40% to about 150% bwocc.

Optionally, embodiments of the treatment fluids may further comprise fly ash. A variety of fly ashes may be suitable, including fly ash classified as Class C or Class F fly ash according to American Petroleum Institute, API Specification for Materials and Testing for Well Cements, API Specification 10, Fifth Ed., Jul. 1, 1990. Suitable examples of fly ash include, but are not limited to, POZMIX® A cement additive, commercially available from Halliburton Energy Services, Inc., Duncan, Okla. Where used, the fly ash generally may be included in the treatment fluids in an amount desired for a particular application. In some embodiments, the fly ash may be present in an amount in a range of from about 1% to about 99% bwocc (e.g., about 1%, about 5%, about 10%, about 20%, about 30%, about 40%, about 50%, about 60%, about 70%, about 80%, about 90%, about 99%, etc.). In some embodiments, the fly ash may be present in an amount in the range of from about 1% to about 20% and, alternatively, from about 1% to about 10% bwocc. One of ordinary skill in the art, with the benefit of this disclosure, should recognize the appropriate amount of the fly ash to include for a chosen application.

Optionally, embodiments of the treatment fluids may further comprise barite. In some embodiments, the barite may be sized barite. Sized barite generally refers to barite that has been separated, sieved, ground, or otherwise sized to produce barite having a desired particle size. For example, the barite may be sized to produce barite having a particle size less than about 200 microns in size. Where used, the barite generally may be included in the treatment fluids in an amount desired for a particular application. For example, the barite may be present in an amount in a range of from about 1% to about 99% bwocc (e.g., about 1%, about 5%, about 10%, about 20%, about 30%, about 40%, about 50%, about 60%, about 70%, about 80%, about 90%, about 99%, etc.). In some embodiments, the barite may be present in an amount in the range of from about 1% to about 20% and, alternatively, from about 1% to about 10% bwocc. One of ordinary skill in the art, with the benefit of this disclosure, should recognize the appropriate amount of the barite to include for a chosen application.

Optionally, embodiments of the treatment fluids may further comprise pumicite. Generally, pumicite is a volcanic rock that may exhibits cementitious properties, in that it may set and harden in the presence of hydrated lime and water. Hydrated lime may be used in combination with the pumicite, in some embodiments. Where used, the pumicite generally may be included in the treatment fluids in an amount desired for a particular application. For example, the pumicite may be present in an amount in a range of from about 1% to about 99% bwocc (e.g., about 1%, about 5%, about 10%, about 20%, about 30%, about 40%, about 50%, about 60%, about 70%, about 80%, about 90%, about 99%, etc.). In some embodiments, the pumicite may be present in an amount in the range of from about 1% to about 20% and, alternatively, from about 1% to about 10% bwocc. One of ordinary skill in the art, with the benefit of this disclosure, should recognize the appropriate amount of the pumicite to include for a chosen application.

Optionally, embodiments of the treatment fluids may further comprise a free water control additive. As used herein, the term "free water control additive" refers to an additive included in a liquid for, among other things, reducing (or preventing) the presence of free water in the liquid. Free water control additives may also reduce (or prevent) the settling of solids. Examples of suitable free water control additives include, but are not limited to, bentonite, amorphous silica, hydroxyethyl cellulose, and combinations thereof. An example of a suitable free water control additive is SA-1015™ suspending agent, available from Halliburton Energy Services, Inc. Another example of a suitable free water control additive is WG17™ solid additive, available from Halliburton Energy Services, Inc. The free water control additive may be provided as a dry solid in some embodiments. Where used, the free water control additive may be present in an amount in the range of from about 0.1% to about 16% bwocc, for example. In alternative embodiments, the free water control additive may be present in an amount in the range of from about 0.1% to about 2% bwocc.

In some embodiments, the treatment fluids may further comprise a lightweight additive. The lightweight additive may be included to reduce the density of embodiments of the treatment fluids. For example, the lightweight additive may be used to form a treatment fluid, for example, having a density of less than about 13 ppg. The lightweight additive typically may have a specific gravity of less than about 2.0. Examples of suitable lightweight additives may include sodium silicate, hollow microspheres, gilsonite, perlite, and combinations thereof. An example of a suitable sodium silicate is ECONOLITE™ additive, available from Halliburton Energy Services, Inc. Where used, the lightweight additive may be present in an amount in the range of from about 0.1% to about 20% bwocc, for example. In alternative embodiments, the lightweight additive may be present in an amount in the range of from about 1% to about 10% bwocc.

As previously mentioned, embodiments of the treatment fluids may be foamed with a gas, for example, to provide a treatment fluid with a reduced density. It should be understood that reduced densities may be needed in displacement embodiments to more approximately match the density of a particular drilling fluid, for example, where lightweight drilling fluids are being used. The drilling fluid 126 may be considered lightweight if it has a density of less than about 13 ppg, alternatively, less than about 10 ppg, and alternatively less than about 9 ppg. In some embodiments, the treatment fluids may be foamed to have a density within about 10% of the density of the drilling fluid 126 and, alternatively, within about 5% of the density of the drilling fluid 126. While techniques, such as lightweight additives, may be used to reduce the density of the treatment fluids comprising kiln dust without foaming, these techniques may have drawbacks. For example, reduction of the treatment fluid's density to below about 13 ppg using lightweight additives may produce unstable slurries, which can have problems with settling of solids, floating of lightweight additives, and free water, among others. Accordingly, the treatment fluid may be foamed to provide a treatment fluid having a reduced density that is more stable.

Therefore, in some embodiments, the treatment fluids may be foamed and comprise water, kiln dust, a foaming agent, and a gas. Optionally, to provide a treatment fluid with a lower density and more stable foam, the treatment fluid may further comprise a lightweight additive, for example. With the lightweight additive, a base slurry may be prepared that may then be foamed to provide an even lower density. In some embodiments, the foamed treatment fluid may have a density in the range of from about 4 ppg to about 13 ppg and, alternatively, about 7 ppg to about 9 ppg. In one particular embodiment, a base slurry may be foamed from a density of in the range of from about 9 ppg to about 13 ppg to a lower density, for example, in a range of from about 7 ppg to about 9 ppg.

The gas used in embodiments of the foamed treatment fluids may be any suitable gas for foaming the treatment fluid, including, but not limited to air, nitrogen, and combinations thereof. Generally, the gas should be present in embodiments of the foamed treatment fluids in an amount sufficient to form the desired foam. In certain embodiments, the gas may be present in an amount in the range of from about 5% to about 80% by volume of the foamed treatment fluid at atmospheric pressure, alternatively, about 5% to about 55% by volume, and, alternatively, about 15% to about 30% by volume.

Where foamed, embodiments of the treatment fluids may comprise a foaming agent for providing a suitable foam. As used herein, the term "foaming agent" refers to a material (e.g., surfactant) or combination of materials that facilitate the formation of a foam in a liquid, for example, by reduction of surface tension. Any suitable foaming agent for forming a foam in an aqueous liquid may be used in embodiments of the treatment fluids. Examples of suitable foaming agents may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming agent is FOAMER™ 760 foamer/stabilizer, available from Halliburton Energy Services, Inc. Generally, the foaming agent may be present in embodiments of the foamed treatment fluids in an amount sufficient to provide a suitable foam. In some embodiments, the foaming agent may be present in an amount in the range of from about 0.8% to about 5% by volume of the water ("bvow").

A wide variety of additional additives may be included in the treatment fluids as deemed appropriate by one skilled in the art, with the benefit of this disclosure. Examples of such additives include, but are not limited to: supplementary cementitious materials, weighting agents, viscosifying agents (e.g., clays, hydratable polymers, guar gum), fluid loss control additives, lost circulation materials, filtration control additives, dispersants, defoamers, corrosion inhibitors, scale inhibitors, formation conditioning agents, and water-wetting surfactant. Water-wetting surfactants may be used to aid in removal of oil from surfaces in the wellbore (e.g., the casing) to enhance cement and consolidating spacer fluid bonding. Examples of suitable weighting agents include, for example, materials having a specific gravity of 3 or greater, such as barite. Specific examples of these, and other, additives include: organic polymers, biopolymers, latex, ground rubber, surfactants, crystalline silica, amorphous silica, silica flour, fumed silica, nano-clays (e.g., clays having at least one dimension less than 100 nm), salts, fibers, hydratable clays, microspheres, rice husk ash, micro-fine cement (e.g., cement having an average particle size of from about 5 microns to about 10 microns), metakaolin, zeolite, shale, Portland cement, Portland cement interground with pumice, perlite, barite, slag, lime (e.g., hydrated lime), gypsum, and any combinations thereof, and the like. In some embodiments, a supplementary cementitious material may be included in the treatment fluid in addition to or in place of all or a portion of the kiln dust. Examples of suitable supplementary cementitious materials include, without limitation, Portland cement, Portland cement interground with pumice, micro-fine cement, fly ash, slag, pumicite, gypsum and any combination thereof. A person having ordinary skill in the art, with the benefit of this disclosure, will readily be able to determine the type and amount of additive useful for a particular application and desired result. It should be understood that, while the present disclosure describes a number of optional additives that may be included in the treatment fluids, it is intended to cover all combinations of the disclosed additives.

As previously mentioned, embodiments of the treatment fluids (e.g., cement composition 142, spacer fluid 140, etc.) may be consolidating in that the treatment fluids may develop gel strength and/or compressive strength in the wellbore 118. Consolidation is defined herein as one of three types of material behavior: Type 1 consolidation is identifiable as a gelled fluid that can be moved and/or pumped when the hydraulic shear stress exceeds the yield point (YP) of the gel. Type 2 consolidation is identifiable as a plastic semi-solid that can experience "plastic deformation" if the shear stress, compressive stress, or tensile stress exceeds the "plastic yield limit." Type 3 consolidation is identifiable as a rigid solid similar to regular set cement. During a steady progressive strain rate during conventional compressive testing, both confined and unconfined, a Type 3 consolidated material would exhibit linear elastic Hookean stress-strain behavior, followed by some plastic yield and/or mechanical failure. The treatment fluid may transform from the pumpable fluid that was placed during the normal displacement operation to Type 1 and/or further progress to Type 2 and/or further progress to Type 3. It should be understood that the consolidation of the treatment fluid is at wellbore conditions and, as will be appreciated by those of ordinary skill in the art, wellbore conditions may vary. However, embodiments of the treatment fluids may be characterized by exhibiting Type 1, Type 2, or Type 3 consolidation under specific wellbore conditions.

Specific examples of how to characterize a Type 1 consolidation include measuring the yield stress. Type 1 consolidation exhibits a YP from about 25 Pascals to about 250 Pascals, where YP is measured by one of the methods described in U.S. Pat. No. 6,874,353, namely: using a series of parallel vertical blades on a rotor shaft, referred to by those skilled in the art as the "Vane Method"; or using the new device and method also described in U.S. Pat. No. 6,874,353. Another method used to define the YP of Type 1 consolidation is defined in Morgan, R. G., Suter, D. A., and Sweat, V. A., *Mathematical Analysis of a Simple Back Extrusion Rheometer*, ASAE Paper No. 79-6001. Additionally, other methods commonly known to those skilled in the art may be used to define the YP of Type 1 consolidated treatment fluid. Alternatively, another method of characterizing a Type 1 consolidation includes measuring the gelled strength of the material, which may be defined as "Static Gel Strength" (SGS) as is defined and measured in accordance with the API Recommended Practice on *Determining the Static Gel Strength of Cement Formations*, ANSI/API Recommended Practice 10B-6. A Type 1 consolidation may exhibit SGS values from about 70 lbf/100 ft$^2$ up to about 500 lbf/100 ft$^2$.

Specific examples of how to characterize a Type 2 consolidation include measuring the yield limit in compression (YL-C). The YL-C refers to the uniaxial compressive stress at which the material experiences a permanent deformation. Permanent deformation refers to a measurable deformation strain that does not return to zero over a period of time that is on the same order of magnitude as the total time required to conduct the measurement. YL-C may range from 1 psi (lbf/in$^2$) to 2,000 psi, with the most common values ranging from 5 psi to 500 psi.

Specific examples of how to characterize a Type 3 consolidation include measuring the compressive strength. Type 3 consolidation will exhibit unconfined uniaxial compressive strengths ranging from about 5 psi to about 10,000 psi, while the most common values will range from about 10 psi to about 2,500 psi. These values are achieved in 7 days or less. Some formulations may be designed so as to provide significant compressive strengths within 24 hours to 48 hours. Typical sample geometry and sizes for measurement are similar to, but not limited to, those used for characterizing oil well cements: 2 inch cubes; or 2 inch diameter cylinders that are 4 inches in length; or 1 inch diameter cylinders that are 2 inches in length; and other methods known to those skilled in the art of measuring "mechanical properties" of oil well cements. For example, the compressive strength may be determined by crushing the samples in a compression-testing machine. The compressive strength is calculated from the failure load divided by the cross-sectional area resisting the load and is reported in units of pound-force per square inch (psi). Compressive strengths may be determined in accordance with API RP 10B-2, Recommended Practice for Testing Well Cements, First Edition, July 2005.

As a specific example of consolidation, when left in an annulus 130 (e.g., between walls of the wellbore 118 and the casing 108 or between the casing 108 and a larger conduit disposed in the wellbore 118), the treatment fluid may consolidate to develop static gel strength and/or compressive strength. The consolidated mass formed in the annulus 130 may act to support and position the casing 108 in the wellbore 118 and bond the exterior surface of the casing 108 to the walls of the wellbore 118 or to the larger conduit. The consolidated mass formed in the annulus 130 may also provide a substantially impermeable barrier to seal off formation fluids and gases and consequently also serve to mitigate potential fluid migration. The consolidated mass formed in the annulus 130 may also protect the casing 108 or other conduit from corrosion.

In some embodiments, consolidation of the treatment fluid (e.g., spacer fluid 140 or cement composition 142) in the wellbore 118 may be measured. The consolidation measurement may also include a measurement of the integrity of the bond formed between the consolidated treatment fluid and the exterior wall of the casing 108 and/or between the consolidated fluid and the walls of the wellbore 118 or larger conduit disposed in the wellbore 118. In some embodiments, data may be collected corresponding to the integrity of this bond, and the data may be recorded on a log, commonly referred to as a "bond long." The bond log may be used to, for example, analyze the consolidation properties of the treatment fluid in the wellbore 118. Accordingly, embodiments may include running a cement bond log on at least the portion of the wellbore 118 containing the consolidated treatment fluid. The cement bond log for the consolidated treatment fluid may be obtained by any method used to measure cement integrity without limitation. In some embodiments, a tool may be run into the wellbore 118 on a wireline that can detect the bond of the consolidated treatment fluid to the casing 108 and/or the walls of the wellbore 118 (or larger conduit). An example of a suitable tool includes a sonic tool.

Embodiments of the treatments fluids (e.g., spacer fluid 140) may have a transition time that is shorter than the transition time of another fluid (e.g., cement composition 142) subsequently introduced into the wellbore 118. The term "transition time," as used herein, refers to the time for a fluid to progress from a static gel strength of about 100 lbf/100 ft$^2$ to about 500 lbf/100 ft$^2$. By having a shorter transition time, the treatment fluid can reduce or even prevent migration of gas in the wellbore 118, even if gas migrates through a subsequently introduced cement composition 124 before it has developed sufficient gel strength to prevent such migration. Gas and liquid migration can typically be prevented at a static gel strength of 500 lbf/100 ft$^2$. By reducing the amount of gas that can migrate through the wellbore 118, the subsequently added cement composition 142 can progress through its slower transition period without gas migration being as significant factor as the cement develops static gel strength. Some embodiments of the treatment fluids may have a transition time (i.e., the time to progress from a static gel strength of about 100 lbf/100 ft$^2$ to about 500 lbf/100 ft$^2$) at wellbore conditions of about 45 minutes or less, about 30 minutes or less, about 20 minutes or less, or about 10 minutes or less. Embodiments of the treatment fluids also quickly develop static gel strengths of about 100 lbf/100 ft$^2$ and about 500 lbf/100 ft$^2$, respectively, at wellbore conditions. The time for a fluid to a develop a static gel strength of about 100 lbf/100 ft$^2$ is also referred to as the "zero gel time." For example, the treatment fluids may have a zero gel time at wellbore conditions of about 8 hours or less, and, alternatively, about 4 hours or less. In some embodiments, the treatment fluids may have a zero gel time in a range of from about 0 minutes to about 4 hours or longer. By way of further example, the treatment fluids may develop static gel strengths of about 500 lbf/100 ft$^2$ or more at wellbore conditions in a time of from about 10 minutes to about 8 hours or longer. The preceding time for development of static gel strengths are listed as being at wellbore conditions. Those of ordinary skill in the art will understand that particular wellbore conditions (e.g., temperature, pressure, depth, etc.) will vary; however, embodiments of the treatment fluids should meet these specific requirements at the wellbore conditions. Static gel strength may be measured in accordance with API Recommended Practice on *Determining the Static Gel Strength of Cement Formations*, ANSI/API Recommended Practice 10B-6.

Embodiments of the treatment fluids may be prepared in accordance with any suitable technique. In some embodiments, the desired quantity of water may be introduced into a mixer (e.g., a cement blender) followed by the dry blend. The dry blend may comprise the kiln dust and additional solid additives, for example. Additional liquid additives, if any, may be added to the water as desired prior to, or after, combination with the dry blend. This mixture may be agitated for a sufficient period of time to form a base slurry. This base slurry may then be introduced into the wellbore 118 via pumps (e.g., cementing unit 144), for example. In the foamed embodiments, the base slurry may be pumped into the wellbore 118, and a foaming agent may be metered into the base slurry followed by injection of a gas, e.g., at a foam mixing "T," in an amount sufficient to foam the base slurry thereby forming a foamed treatment fluid, in accordance with certain embodiments. After foaming, the foamed treatment fluid may be introduced into the wellbore 118. As will be appreciated by those of ordinary skill in the art, with the benefit of this disclosure, other suitable techniques for preparing treatment fluids may be used in accordance with the present disclosure.

In some embodiments, methods may include enhancing rheological properties of a treatment fluid (e.g., spacer fluid 140, cement composition 142, etc.). The method may comprise including kiln dust in a treatment fluid. Optional additives as described previously may also be included in the treatment fluid. The kiln dust may be included in the treatment fluid in an amount sufficient to provide a higher yield point than a first fluid. The higher yield point may be desirable, for example, to effectively displace the first fluid from the wellbore. As used herein, the term "yield point" refers to the resistance of a fluid to initial flow, or representing the stress required to start fluid movement. In an embodiment, the yield point of the treatment fluid at a temperature of up to about 180° F. is greater than about 5 lb/100 ft$^2$. In an embodiment, the yield point of the treatment fluid at a temperature of up to about 180° F. is greater than about 10 lb/100 ft$^2$. In an embodiment, the yield point of the treatment fluid at a temperature of up to about 180° F. is greater than about 20 lb/100 ft$^2$. It may be desirable for the treatment fluid to not thermally thin to a yield point below the first fluid at elevated temperatures. Accordingly, the treatment fluid may have a higher yield point than the first fluid at elevated temperatures, such as 180° F. or bottom hole static temperature ("BHST"). In one embodiment, the treatment fluid may have a yield point that increases at elevated temperatures. For example, the treatment fluid may have a yield point that is higher at 180° F. than at 80° F. By way of further example. The treatment fluid may have a yield point that is higher at BHST than at 80° F.

In some embodiments, the treatment fluids may be used in the displacement of a drilling fluid 126 from a wellbore 118. The drilling fluid 126 may include, for example, any number of fluids, such as solid suspensions, mixtures, and emulsions. In some embodiments, the drilling fluid 126 may comprise an oil-based drilling fluid. An example of a suitable oil-based drilling fluid comprises an invert emulsion. In some embodiments, the oil-based drilling fluid may comprise an oleaginous fluid. Examples of suitable oleaginous fluids that may be included in the oil-based drilling fluids include, but are not limited to, α-olefins, internal olefins, alkanes, aromatic solvents, cycloalkanes, liquefied petroleum gas, kerosene, diesel oils, crude oils, gas oils, fuel oils, paraffin oils, mineral oils, low-toxicity mineral oils, olefins, esters, amides, synthetic oils (e.g., polyolefins), polydiorganosiloxanes, siloxanes, organosiloxanes, ethers, acetals, dialkylcarbonates, hydrocarbons, and combinations thereof.

To facilitate a better understanding of the present invention, the following examples of certain aspects of some embodiments are given. In no way should the following examples be read to limit, or define, the scope of the invention. In the following examples, concentrations are given in weight percent of the overall composition.

Example 1

Sample treatment fluids were prepared to evaluate the rheological properties of spacer fluids containing kiln dust. In this example, cement kiln dust was used. The sample treatment fluids were prepared as follows. First, all dry components (e.g., cement kiln dust, fly ash, bentonite, free water control additive, etc.) were weighed into a glass container having a clean lid and agitated by hand until blended. Tap water was then weighed into a Waring blender jar. The dry components were then mixed into the water with 4,000 rpm stirring. The blender speed was then increased to 12,000 rpm for about 35 seconds.

Sample Spacer Fluid No. 1 was an 11 pound per gallon slurry that comprised 60.62% water, 34.17% cement kiln dust, 4.63% fly ash, and 0.58% free water control additive (WG-17™ solid additive).

Sample Spacer Fluid No. 2 was an 11 pound per gallon slurry that comprised 60.79% water, 30.42% cement kiln dust, 4.13% fly ash, 0.17% free water control additive (WG-17™ solid additive), 3.45% bentonite, and 1.04% Econolite™ additive.

Rheological values were then determined using a Fann Model 35 Viscometer. Dial readings were recorded at speeds of 3, 6, 100, 200, and 300 with a B1 bob, an R1 rotor, and a 1.0 spring. The dial readings, plastic viscosity, and yield points for the spacer fluids were measured in accordance with API Recommended Practices 10B, Bingham plastic model and are set forth in the table below. The abbreviation "PV" refers to plastic viscosity, while the abbreviation "YP" refers to yield point.

TABLE 1

| Sample Fluid | Temp. (° F.) | Viscometer RPM | | | | | PV (cP) | YP (lb/100 ft$^2$) |
|---|---|---|---|---|---|---|---|---|
| | | 300 | 200 | 100 | 6 | 3 | | |
| 1 | 80 | 145 | 127 | 90 | 24 | 14 | 113.3 | 27.4 |
| | 180 | 168 | 143 | 105 | 26 | 15 | 154.5 | 30.3 |
| 2 | 80 | 65 | 53 | 43 | 27 | 22 | 41.1 | 26.9 |
| | 180 | 70 | 61 | 55 | 22 | 18 | 51.6 | 25.8 |

The thickening time of the Sample Fluid No. 1 was also determined in accordance with API Recommended Practice 10B at 205° F. Sample Fluid No. 1 had a thickening time of more than 6:00+ hours.

Accordingly, the above example illustrates that the addition of cement kiln dust to a treatment fluid may provide suitable properties for use in subterranean applications. In particular, the above example illustrates, inter alia, that the cement kiln dust may be used to provide a treatment fluid that may not exhibit thermal thinning with the treatment fluid potentially even having a yield point that increases with temperature. For example, Sample Fluid No. 2 had a higher yield point at 180° F. than at 80° F. In addition, the yield point of Sample Fluid No. 1 had only a slight decrease at 180° F. as compared to 80° F. Even further, the example illustrates that addition of the cement kiln dust to a treatment fluid may provide a plastic viscosity that increases with temperature.

Example 2

Additional sample treatment fluids were prepared to further evaluate the rheological properties of spacer fluids containing kiln dust. Cement kiln dust was used in this example, The sample treatment fluids were prepared as follows. First, all dry components (e.g., cement kiln dust, fly ash) were weighed into a glass container having a clean lid and agitated by hand until blended. Tap water was then weighed into a Waring blender jar. The dry components were then mixed into the water with 4,000 rpm stirring. The blender speed was then increased to 12,000 rpm for about 35 seconds.

Sample Fluid No. 3 was a 12.5 pound per gallon fluid that comprised 47.29% water and 52.71% cement kiln dust.

Sample Fluid No. 4 was a 12.5 pound per gallon fluid that comprised 46.47% water, 40.15% cement kiln dust, and 13.38% fly ash.

Sample Fluid No. 5 was a 12.5 pound per gallon fluid that comprised 45.62% water, 27.19% cement kiln dust, and 27.19% fly ash.

Sample Fluid No. 6 was a 12.5 pound per gallon fluid that comprised 44.75% water, 13.81% cement kiln dust, and 41.44% fly ash.

Sample Fluid No. 7 (comparative) was a 12.5 pound per gallon fluid that comprised 43.85% water, and 56.15% fly ash.

Rheological values were then determined using a Fann Model 35 Viscometer. Dial readings were recorded at speeds of 3, 6, 30, 60, 100, 200, 300, and 600 with a B1 bob, an R1 rotor, and a 1.0 spring. The dial readings, plastic viscosity, and yield points for the spacer fluids were measured in accordance with API Recommended Practices 10B, Bingham plastic model and are set forth in the table below. The abbreviation "PV" refers to plastic viscosity, while the abbreviation "YP" refers to yield point.

TABLE 2

| Sample Fluid | Cement Kiln Dust-Fly Ash Ratio | Temp. (° F.) | Viscometer RPM | | | | | | | | PV (cP) | YP (lb/100 ft$^2$) |
|---|---|---|---|---|---|---|---|---|---|---|---|---|
| | | | 600 | 300 | 200 | 100 | 60 | 30 | 6 | 3 | | |
| 3 | 100:0 | 80 | 33 | 23 | 20 | 15 | 13 | 12 | 8 | 6 | 12 | 11 |
| | | 130 | 39 | 31 | 27 | 23 | 22 | 19 | 16 | 11 | 12 | 19 |
| | | 180 | 66 | 58 | 51 | 47 | 40 | 38 | 21 | 18 | 16.5 | 41.5 |
| 4 | 75:25 | 80 | 28 | 22 | 19 | 15 | 14 | 11 | 8 | 6 | 10.5 | 11.5 |
| | | 130 | 39 | 28 | 25 | 21 | 19 | 16 | 14 | 11 | 10.5 | 17.5 |
| | | 180 | 51 | 39 | 36 | 35 | 31 | 26 | 16 | 11 | 6 | 33 |
| 5 | 50:50 | 80 | 20 | 11 | 8 | 6 | 5 | 4 | 4 | 3 | 7.5 | 3.5 |
| | | 130 | 21 | 15 | 13 | 10 | 9 | 8 | 6 | 5 | 7.5 | 7.5 |
| | | 180 | 25 | 20 | 17 | 14 | 13 | 12 | 7 | 5 | 9 | 11 |
| 6 | 25:75 | 80 | 16 | 8 | 6 | 3 | 2 | 1 | 0 | 0 | 7.5 | 0.5 |
| | | 130 | 15 | 8 | 6 | 4 | 3 | 2 | 1 | 1 | 6 | 2 |
| | | 180 | 15 | 9 | 7 | 5 | 4 | 4 | 2 | 2 | 6 | 3 |
| 7 (Comp.) | 0:100 | 80 | 16 | 7 | 5 | 3 | 1 | 0 | 0 | 0 | 6 | 1 |
| | | 130 | 11 | 4 | 3 | 1 | 0 | 0 | 0 | 0 | 4.5 | −0.5 |
| | | 180 | 8 | 3 | 2 | 0 | 0 | 0 | 0 | 0 | 4.5 | −1.5 |

Accordingly, the above example illustrates that the addition of the cement kiln dust to a treatment fluid may provide suitable properties for use in subterranean applications. In particular, the above example illustrates, inter alia, that the cement kiln dust may be used to provide a treatment fluid that may not exhibit thermal thinning with the treatment fluid potentially even having a yield point that increases with temperature. In addition, as illustrated in Table 2 above, higher yield points were observed for treatment fluids with higher concentrations of the cement kiln dust.

Example 3

A sample treatment fluid containing kiln dust was prepared to compare the rheological properties of a treatment fluid containing kiln dust with an oil-based drilling fluid. In this example, cement kiln dust was used. The sample fluid was prepared as follows. First, all dry components (e.g., cement kiln dust, fly ash, bentonite, etc.) were weighed into a glass container having a clean lid and agitated by hand until blended. Tap water was then weighed into a Waring blender jar. The dry components were then mixed into the water with 4,000 rpm stirring. The blender speed was then increased to 12,000 rpm for about 35 seconds.

Sample Fluid No. 8 was an 11 pound per gallon slurry that comprised 60.79% water, 30.42% cement kiln dust, 4.13% fly ash, 0.17% free water control additive (WG-17™ solid additive), 3.45% bentonite, and 1.04% Econolite™ additive.

The oil-based drilling fluid was a 9.1 pound per gallon oil-based mud.

Rheological values were then determined using a Fann Model 35 Viscometer. Dial readings were recorded at speeds of 3, 6, 100, 200, and 300 with a B1 bob, an R1 rotor, and a 1.0 spring. The dial readings, plastic viscosity, and yield points for the spacer fluid and drilling fluid were measured in accordance with API Recommended Practices 10B, Bingham plastic model and are set forth in the table below. The abbreviation "PV" refers to plastic viscosity, while the abbreviation "YP" refers to yield point. The abbreviation "OBM" refers to oil-based mud.

TABLE 3

| Sample Fluid | Temp. (° F.) | Viscometer RPM | | | | | PV (cP) | YP (lb/100 ft$^2$) |
|---|---|---|---|---|---|---|---|---|
| | | 300 | 200 | 100 | 6 | 3 | | |
| 8 | 80 | 59 | 50 | 39 | 22 | 15 | 42 | 21.2 |
| | 180 | 82 | 54 | 48 | 16 | 13 | 65.3 | 17 |
| OBM | 80 | 83 | 64 | 41 | 11 | 10 | 74.6 | 12.1 |
| | 180 | 46 | 35 | 23 | 10 | 10 | 36.7 | 10.5 |

Accordingly, the above example illustrates that the addition of cement kiln dust to a treatment fluid may provide suitable properties for use in subterranean applications. In particular, the above example illustrates, inter alia, that the cement kiln dust may be used to provide a treatment fluid with a yield point that is greater than a drilling fluid even at elevated temperatures. For example, Sample Fluid No. 8 has a higher yield point at 180° F. than the oil-based mud.

Example 4

A foamed treatment fluid (Sample Fluid 9) was prepared that comprised cement kiln dust. First, a base slurry was prepared that had a density of 10 ppg and comprised cement kiln dust, a free water control additive (0.7% by weight of cement kiln dust), a lightweight additive (4% by weight of cement kiln dust), and fresh water (32.16 gallons per 94-pound sack of cement kiln dust). The free water control additive was SA1015™ suspending aid. The lightweight additive was ECONOLITE™ additive. Next, a foaming agent (FOAMER™ 760 foamer/stabilizer) in an amount of 2% bvow was added, and the base slurry was then mixed in a foam blending jar for 4 seconds at 12,000 rpm. The resulting foamed treatment fluid had a density of 8.4 ppg. The "sink" of the resultant foamed treatment fluid was then measured using a free fluid test procedure as specified in API Recommended Practice 10B. However, rather than measuring the free fluid, the amount of "sink" was measured after the foamed treatment fluid remained static for a period of 2 hours. The foamed treatment fluid was initially at 200° and cooled to ambient temperature over the 2-hour period. The measured sink for this foamed treatment fluid was 5 millimeters.

Example 5

Another foamed treatment fluid (Sample Fluid 10) was prepared that comprised cement kiln dust. First, a base slurry was prepared that had a density of 10.5 ppg and comprised cement kiln dust, a free water control additive (0.6% by weight of cement kiln dust), a lightweight additive (4% by weight of cement kiln dust), and fresh water (23.7 gallons per 94-pound sack of cement kiln dust). The free water control additive was SA1015™ suspending aid. The lightweight additive was ECONOLITE™ additive. Next, a foaming agent (a hexylene glycol/cocobetaine blended surfactant) in an amount of 2% bvow was added, and the base slurry was then mixed in a foam blending jar for 6 seconds at 12,000 rpm. The resulting foamed treatment fluid had a density of 8.304 ppg. The resultant foamed treatment fluid had a sink of 0 millimeters, measured as described above for Example 4.

Example 6

The following series of tests were performed to determine the compressive strength of sample treatment fluids after consolidation. Twenty-two samples, labeled sample fluids 11-32 in the table below, were prepared having a density of 12.5 ppg using various concentrations of additives. The amount of these additives in each sample fluid are indicated in the table below with "% by weight" indicating the amount of the particular component by weight of Additive 1+Additive 2. The abbreviation "gal/sk" in the table below indicates gallons of the particular component per 94-pound sack of Additive 1 and Additive 2.

The cement kiln dust used was supplied by Holcim (US) Inc., from Ada, Okla. The shale used was supplied by Texas Industries, Inc., from Midlothian, Tex. The pumice used was either DS-200 or DS-300 lightweight aggregate available from Hess Pumice Products, Inc. The silica flour used was SSA-1™ cement additive, from Halliburton Energy Services, Inc. The course silica flour used was SSA-2™ course silica flour, from Halliburton Energy Services, Inc. The metakaolin used was MetaMax® metakaolin, from BASF. The amorphous silica used was SILICALITE™ cement additive, from Halliburton Energy Services, Inc. The perlite used was supplied by Hess Pumice Products, Inc. The slag used was supplied by LaFarge North America. The Portland cement Inter-ground with pumice was FineCem™ cement, from Halliburton Energy Services, Inc. The fly ash used was POZ-MIX® cement additive, from Halliburton Energy Services, Inc. The micro-fine cement used was MICRO MATRIX® cement having an average particle size of 7.5 microns, from Halliburton Energy Services, Inc. The rice husk ash used was supplied by Rice Hull Specialty Products, Stuttgart, Ark. The biopolymer used was supplied by CP Kelco, San Diego, Calif. The barite used was supplied by Baroid Industrial Drilling Products. The latex used was Latex 3000™ cement additive from Halliburton Energy Services, Inc. The ground rubber used was LIFECEM™ 100 cement additive from Halliburton Energy Services, Inc. The nano-clay used was supplied by Nanocor Inc. The set retarder used was SCR-100™ cement retarder, from Halliburton Energy Services, Inc. SCR-100™ cement retarder is a copolymer of acrylic acid and 2-acrylamido-2-methylpropane sulfonic acid.

After preparation, the sample fluids were allowed to cure for seven days in a 2" by 4" metal cylinder that was placed in a water bath at 180° F. to form set cylinders. Immediately after removal from the water bath, destructive compressive strengths were determined using a mechanical press in accordance with API RP 10B-2. The results of these tests are set forth below. The term "cement kiln dust" is abbreviated "CKD" in the table below.

TABLE 4

| Sample Fluid | Water gal/sk | Additive #1 Type | % by wt | Additive #2 Type | % by wt | Additive #3 Type | % by wt | Cement Set Retarder % by wt | 7-Day Comp. Strength PSI |
|---|---|---|---|---|---|---|---|---|---|
| 11 | 5.72 | CKD | 50 | Shale | 50 | — | — | 0 | 510 |
| 12 | 4.91 | Pumice DS-200 | 50 | Lime | 50 | — | — | 1 | 646 |
| 13 | 5.88 | CKD | 50 | Silica Flour | 50 | — | — | 0 | 288 |
| 14 | 6.05 | CKD | 50 | Metakaolin | 50 | — | — | 0 | 104 |
| 15 | 5.71 | CKD | 50 | Amorphous Silica | 50 | — | — | 1 | 251 |
| 16 | 5.13 | CKD | 50 | Perlite | 50 | — | — | 0 | 1031 |
| 17 | 5.4 | CKD | 50 | Lime | 50 | — | — | 0 | 58 |
| 18 | 5.49 | CKD | 50 | Pumice DS-200 | 50 | — | — | 0 | 624 |
| 19 | 6.23 | CKD | 50 | Slag | 50 | — | — | 0 | 587 |
| 20 | 5.88 | CKD | 50 | Course Silica Flour | 50 | — | — | 0 | 1018 |
| 21 | 6.04 | CKD | 50 | Portland Cement Interground with Pumice | 50 | — | — | 1 | 1655 |
| 22 | 5.63 | CKD | 50 | Fly Ash | 50 | — | — | 0 | 870 |
| 23 | 5.49 | CKD | 50 | Pumice DS-325 | 50 | — | — | 0 | 680 |
| 24 | 5.03 | Fly Ash | 50 | Lime | 50 | — | — | 1 | 170 |
| 25 | 5.65 | Slag | 50 | Lime | 50 | — | — | 1 | 395 |
| 26 | 6.36 | CKD | 50 | Micro-fine cement | 50 | — | — | 2 | 788 |
| 27 | 6.08 | CKD | 80 | Rice Husk Ash | 20 | — | — | 1 | 203 |
| 28 | 5.42 | CKD | 50 | Biopolymer | 50 | — | — | 1 | 265 |
| 29 | 7.34 | CKD | 50 | Barite | 50 | — | — | 0 | 21 |
| 30 | 4.02 | CKD | 100 | — | — | Latex | 2 | 1 | 164.6 |
| 31 | 2.71 | CKD | 100 | — | — | Ground Rubber | 10 | 1 | 167.6 |
| 32 | 6.15 | CKD | 100 | — | — | Nano-Clay | 2 | 0 | 102.5 |

Accordingly, the above example illustrates that a treatment fluid comprising kiln dust may be capable of consolidation. For example, 7-day compressive strengths of 1000 psi or even higher were observed for certain sample slurries.

Example 7

The following series of tests were performed to evaluate the thickening times of sample treatment fluids. For this example, the thickening times for Sample Fluids 11-32 from Example 6 were determined. As indicated below, the compositions for Samples Fluids 11-32 were the same as from Example 6 except the concentration of the cement set retarder was adjusted for certain samples. The thickening time, which is the time required for the compositions to reach 70 Bearden units of consistency, was determined for each fluid at 230° F. in accordance with API RP 10B-2. The results of these tests are set forth below. The term "cement kiln dust" is abbreviated "CKD" in the table below.

TABLE 5

| Sample Fluid | Water gal/sk | Additive #1 Type | % by wt | Additive #2 Type | % by wt | Additive #3 Type | % by wt | Cement Set Retarder % by wt | Thickening Time hr:min |
|---|---|---|---|---|---|---|---|---|---|
| 11 | 5.72 | CKD | 50 | Shale | 50 | — | — | 1 | 11:04 |
| 12 | 4.91 | Pumice DS-200 | 50 | Lime | 50 | — | — | 1 | 0:30 |
| 13 | 5.88 | CKD | 50 | Silica Flour | 50 | — | — | 1 | 3:31 |
| 14 | 6.05 | CKD | 50 | Metakaolin | 50 | — | — | 1 | 3:13 |
| 15 | 5.71 | CKD | 50 | Amorphous Silica | 50 | — | — | 1 | 2:15 |
| 16 | 5.13 | CKD | 50 | Perlite | 50 | — | — | 1 | 7:30 |
| 17 | 5.4 | CKD | 50 | Lime | 50 | — | — | 1 | 2:42 |
| 18 | 5.49 | CKD | 50 | Pumice DS-200 | 50 | — | — | 1 | 10:00 |

TABLE 5-continued

| Sample Fluid | Water gal/sk | Additive #1 Type | % by wt | Additive #2 Type | % by wt | Additive #3 Type | % by wt | Cement Set Retarder % by wt | Thickening Time hr:min |
|---|---|---|---|---|---|---|---|---|---|
| 19 | 6.23 | CKD | 50 | Slag | 50 | — | — | 1 | 8:08 |
| 20 | 5.88 | CKD | 50 | Course Silica Flour | 50 | — | — | 1 | 20 hr+ |
| 21 | 6.04 | CKD | 50 | Portland Cement Interground with Pumice | 50 | — | — | 1 | 5:58 |
| 22 | 5.63 | CKD | 50 | Fly Ash | 50 | — | — | 1 | 12 hr+ |
| 23 | 5.49 | CKD | 50 | Pumice DS-325 | 50 | — | — | 1 | 7:30 |
| 24 | 5.03 | Fly Ash | 50 | Lime | 50 | — | — | 1 | 3:32 |
| 25 | 5.65 | Slag | 50 | Lime | 50 | — | — | 1 | 4:05 |
| 26 | 6.36 | CKD | 50 | Micro-fine cement | 50 | — | — | 2 | 1:30 |
| 27 | 6.08 | CKD | 80 | Rice Husk Ash | 20 | — | — | 1 | 30 hr+ |
| 28 | 5.42 | CKD | 50 | Biopolymer | 50 | — | — | 1 | 1:35 |
| 29 | 7.34 | CKD | 50 | Barite | 50 | — | — | 1 | 18 hr+ |
| 30 | 4.02 | CKD | 100 | — | — | Latex | 2 | 1 | 1:10 |
| 31 | 2.71 | CKD | 100 | — | — | Ground Rubber | 10 | 1 | 20 hr+ |
| 32 | 6.15 | CKD | 100 | — | — | Nano-Clay | 2 | 0 | 54:00 |

Accordingly, the above example illustrates that a settable spacer fluid may have acceptable thickening times for certain applications.

Example 8

The following series of tests were performed to evaluate the rheological properties of sample fluids. For this example, the rheological properties of Sample Fluids 11-32 were determined. The rheological values were determined using a Fann Model 35 Viscometer. Dial readings were recorded at speeds of 3, 6, 30, 60, 100, 200, 300, and 600 with a B1 bob, an R1 rotor, and a 1.0 spring. An additional sample was used for this specific test. It is Sample Fluid 33 and comprised barite and 0.5% of a suspending agent by weight of the barite. The suspending agent was SA™-1015, available from Halliburton Energy Services, Inc. The water was included in an amount sufficient to provide a density of 12.5 ppg. Sample 33's rheological properties were measured twice at two different temperatures and the values per temperature were averaged to present the data shown below. Temperature is measured in degrees Fahrenheit. The results of these tests are set forth below.

TABLE 6

| Sample Fluid | Additive #1 Type | % by wt | Additive #2 Type | % by wt | Additive #3 Type | % by wt | Temp | Viscometer RPM | | | | | | | |
|---|---|---|---|---|---|---|---|---|---|---|---|---|---|---|---|
| | | | | | | | | 300 | 200 | 100 | 60 | 30 | 6 | 3 | 600 |
| 11 | CKD | 50 | Shale | 50 | — | — | 80 | 29 | 21 | 14 | 11 | 9 | 6 | 5 | 39 |
| 12 | Pumice DS-200 | 50 | Lime | 50 | — | — | 80 | 24 | 17 | 9 | 6 | 5 | 2 | 1 | 48 |
| 13 | CKD | 50 | Silica Flour | 50 | — | — | 80 | 16 | 12 | 8 | 6 | 5 | 4 | 3 | 24 |
| 14 | CKD | 50 | Metakaolin | 50 | — | — | 80 | 36 | 28 | 19 | 15 | 12 | 9 | 8 | 64 |
| 15 | CKD | 50 | Amorphous Silica | 50 | — | — | 80 | 31 | 24 | 18 | 14 | 12 | 10 | 9 | 49 |
| 16 | CKD | 50 | Perlite | 50 | — | — | 80 | 40 | 34 | 27 | 23 | 20 | 15 | 9 | 61 |
| 17 | CKD | 50 | Lime | 50 | — | — | 80 | 46 | 41 | 34 | 30 | 27 | 16 | 11 | 65 |
| 18 | CKD | 50 | Pumice DS-200 | 50 | — | — | 80 | 23 | 19 | 14 | 11 | 9 | 7 | 6 | 40 |
| 19 | CKD | 50 | Slag | 50 | — | — | 80 | 23 | 20 | 14 | 11 | 9 | 6 | 5 | 41 |
| 20 | CKD | 50 | Course Silica Flour | 50 | — | — | 80 | 27 | 19 | 12 | 9 | 7 | 4 | 3 | 64 |
| 21 | CKD | 50 | Portland Cement Interground | 50 | — | — | 80 | 15 | 10 | 7 | 5 | 3 | 2 | 1 | 18 |

TABLE 6-continued

| Sample Fluid | Additive #1 Type | % by wt | Additive #2 Type | % by wt | Additive #3 Type | % by wt | Temp | Viscometer RPM | | | | | | | |
|---|---|---|---|---|---|---|---|---|---|---|---|---|---|---|---|
| | | | | | | | | 300 | 200 | 100 | 60 | 30 | 6 | 3 | 600 |
| 22 | CKD | 50 | Fly Ash with Pumice | 50 | — | — | 80 | 12 | 9 | 6 | 4 | 3 | 2 | 1 | 21 |
| 23 | CKD | 50 | Pumice DS-325 | 50 | — | — | 80 | 39 | 32 | 24 | 21 | 17 | 12 | 7 | 57 |
| 24 | Fly Ash | 50 | Lime | 50 | — | — | 80 | 12 | 9 | 6 | 4 | 3 | 2 | 2 | 24 |
| 25 | Slag | 50 | Lime | 50 | — | — | 80 | 15 | 10 | 5 | 3 | 2 | 1 | 1 | 23 |
| 26 | CKD | 50 | Micro fine cement | 50 | — | — | 80 | 10 | 7 | 4 | 3 | 2 | 1 | 0 | 14 |
| 27 | CKD | 80 | Rice Husk Ash | 20 | — | — | 80 | 24 | 15 | 9 | 7 | 5 | 3 | 2 | 41 |
| 28 | CKD | 50 | Biopolymer | 50 | — | — | 80 | 175 | 111 | 53 | 31 | 15 | 4 | 3 | 220 |
| 29 | CKD | 50 | Barite | 50 | — | — | 80 | 48 | 40 | 30 | 26 | 22 | 15 | 13 | 2 |
| 30 | CKD | 100 | — | — | Latex | 2 | 80 | 48 | 39 | 28 | 23 | 19 | 17 | 15 | 82 |
| 31 | CKD | 100 | — | — | Ground Rubber | 10 | 80 | 65 | 56 | 42 | 40 | 39 | 30 | 22 | 105 |
| 32 | CKD | 100 | — | — | Nano-Clay | 2 | 80 | 22 | 18 | 12 | 10 | 8 | 6 | 5 | 37 |
| 33 | Barite | 100 | — | — | SA™-1015 | 0.5 | 80 | 41 | 36.5 | 30.5 | 28 | 25.5 | 20.5 | 18.5 | NA |
| 33 | Barite | 100 | — | — | SA™-1015 | 0.5 | 180 | 38 | 35.5 | 32 | 30 | 28 | 23.5 | 22 | NA |

Accordingly, the above example indicates that a treatment fluid may have acceptable rheological properties for a particular application.

Example 9

The following series of tests were performed to further evaluate the compressive strength of sample treatment fluids. Ten samples, labeled Sample Fluids 34-43 in the table below were prepared, having a density of 13 ppg using various concentrations of additives. The amount of these additives in each sample are indicated in the table below with "% by weight" indicating the amount of the particular component by weight of the dry solids, which is the kiln dust, the Portland cement, the cement accelerator, the fly ash, and/or the lime. The abbreviation "gal/sk" in the table below indicates gallons of the particular component per 94-pound sack of the dry solids. The term "cement kiln dust" is abbreviated "CKD" in the table below.

The cement kiln dust used was Mountain cement kiln dust from Laramie Wyo., except for Sample Fluid 43 which used cement kiln dust from Holcim (US) Inc., Ada, Okla. The Portland cement used in Sample Fluids 34 and 35 was CEMEX Type 3 Portland cement, from CEMEX USA. The cement accelerator used in Sample Fluid 34 was CAL-SEAL™ accelerator, from Halliburton Energy Services Inc. CAL-SEAL™ Accelerator is gypsum. The Class F fly ash used in Slurries 37-41 was from Coal Creek Station. The Class C fly ash used in Slurries 36 was from LaFarge North America.

After preparation, the samples were allowed to cure for twenty-four or forty-eight hours in a 2" by 4" metal cylinder that was placed in a water bath at 160° F. to form set cylinders. For certain samples, separate cylinders were cured for twenty-four hours and forty-eight hours. Immediately after removal from the water bath, destructive compressive strengths were determined using a mechanical press in accordance with API RP 10B-2. The results of these tests are set forth below.

TABLE 7

| Sample Fluid | Water gal/sk | CKD % by wt | Portland Cement % by wt | Cement Accel. % by wt | Class F Fly Ash % by wt | Class C Fly Ash % by wt | Lime % by wt | 24-Hr Comp. Strength PSI | 48-Hr Comp. Strength PSI |
|---|---|---|---|---|---|---|---|---|---|
| 34 | 8.75 | 85 | 10 | 5 | 0 | 0 | 0 | 73.4 | — |
| 35 | 8.75 | 90 | 10 | 0 | 0 | 0 | 0 | 99.8 | — |
| 36 | 8.14 | 70 | 0 | 0 | 0 | 30 | 0 | 210 | — |
| 37 | 8.25 | 70 | 0 | 0 | 25 | 0 | 5 | 388 | — |
| 38 | 8.20 | 75 | 0 | 0 | 21 | 0 | 4 | 300 | 784 |
| 39 | 8.27 | 80 | 0 | 0 | 17.5 | 0 | 2.5 | 224 | 641 |
| 40 | 9.61 | 70 | 0 | 0 | 25 | 0 | 5 | 219 | 567 |
| 41 | 11.5 | 70 | 0 | 0 | 25 | 0 | 5 | 165 | 369 |
| 42 | 5.12 | 100 | 0 | 0 | 0 | 0 | 0 | 36.2 | — |
| 43 | 5.12 | 100 | 0 | 0 | 0 | 0 | 0 | 60.8 | — |

Accordingly, the above example illustrates that a treatment fluid may have acceptable compressive strengths for certain applications.

Example 10

The following series of tests were performed to evaluate the static gel strength development of sample treatment fluids. Two samples, labeled Sample Fluids 44 and 45 were prepared having a density of 11 and 13.5 ppg respectively using various concentrations of additives. The component concentrations of each sample are as follows:

For Sample Fluid 44, the sample comprised a blend of cement kiln dust (80% by weight), fly ash (16% by weight) and hydrated lime (4% by weight). The sample also comprised a suspending aid in an amount of 0.4% by weight of the blend. Sufficient water was included in the sample to provide a density of 11 ppg. The cement kiln dust used was from Holcim (US) Inc., Ada, Okla. The fly ash used was POZMIX® cement additive, from Halliburton Energy Services, Inc. The suspending agent was SA™-1015 suspending agent, available from Halliburton Energy Services, Inc.

For Sample Fluid 45, the sample comprised a mixture of cement kiln dust (80% by weight), fly ash (16% by weight), and hydrate lime (4% by weight). Sufficient water was included in the sample to provide a density of 13.5 ppg. The cement kiln dust used was from Holcim (US) Inc., Ada, Okla. The fly ash used was POZMIX® cement additive, from Halliburton Energy Services, Inc.

The static gel strength of the samples was measured in accordance with API Recommended Practice on *Determining the Static Gel Strength of Cement Formations*, ANSI/API Recommended Practice 10B-6. FIGS. 1 and 2 show the static gel strength measurements for Sample Fluids 44 and 45, respectively, as a function of time. As seen in the figures, the samples progress through the transition time, defined as the time between 100 SGS and 500 SGS, very quickly with a total transition time of 19 minutes for the sample 34 and 6 minutes for sample 35. These short transition times are faster than most cement compositions.

Example 11

The following tests were performed to further evaluate the static gel strength development of sample treatment fluids. Two samples, labeled Samples Fluids 46 and 47 were prepared having a density of 13.002 and 10.999 ppg respectively using various concentrations of additives. The component concentrations of each sample are as follows:

For Sample Fluid 46, the sample comprised a blend of cement kiln dust (100% by weight), POZMIX® cement additive (50% by weight of the cement kiln dust), HR®-601 cement retarder (1% by weight of the cement kiln dust), HR®-25 cement retarder (0.6% by weight of the cement kiln dust), and D-Air 5000™ defoamer (0.5% by weight of the cement kiln dust). Sufficient water was included in the sample to provide a density of 13.002 ppg. The cement kiln dust used was from Holcim (US) Inc., Ada, Okla. POZMIX® cement additive was from Halliburton Energy Services, Inc. HR®-601 cement retarder was from Halliburton Energy Services, Inc. HR®-25 cement retarder was from Halliburton Energy Services, Inc. D-Air 5000™ defoamer was from Halliburton Energy Services, Inc.

For Sample Fluid 47, the sample comprised a blend of cement kiln dust (100% by weight), SA-1015 (0.4% by weight of the cement kiln dust), and D-Air 5000™ defoamer (0.5% by weight of the cement kiln dust). Sufficient water was included in the sample to provide a density of 10.999 ppg. The cement kiln dust used was from Holcim (US) Inc., Ada, Okla. SA™-1015 suspending agent was from Halliburton Energy Services, Inc. D-Air 5000™ defoamer was from Halliburton Energy Services, Inc.

The static gel strength of the samples was measured in accordance with API Recommended Practice on *Determining the Static Gel Strength of Cement Formations*, ANSI/API Recommended Practice 10B-6. Table 8 shows the static gel strength measurements for Samples Fluids 46 and 47, respectively.

TABLE 8

| Sample Fluid | Temp (° F.) | Time to reach 100 lbf/100 ft² (hr:min) | Time to reach 500 lbf/100 ft² (hr:min) | Difference between 100 lbf/ 100 ft² and 500 lbf/100 ft² (hr:min) |
|---|---|---|---|---|
| 46 | 220 | 3:25 | 5:04 | 1:39 |
| 47 | 220 | 3:07 | 3:17 | 00:10 |

As seen in the table, Sample Fluid 47 progresses through the transition time, defined as the time between 100 SGS and 500 SGS, very quickly with a total transition time of 10 minutes. Sample Fluid 46 is much slower taking over an hour to progress through the transition time. The short transition time of Sample Fluid 47 is faster than most cement compositions.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method comprising:
    drilling a wellbore in a subterranean formation using a bottom hole assembly attached to a tubular, wherein an annulus is defined between the tubular and walls of the wellbore; and
    pumping a consolidating spacer fluid into the annulus through the bottom hole assembly, wherein the consolidating spacer fluid comprises a kiln dust and water; wherein the bottom hole assembly comprises a drill bit, wherein the consolidating spacer fluid is pumped through the drill bit, and wherein the consolidating spacer fluid is pumped into the wellbore between a drilling fluid and a cement composition.

2. The method of claim 1, wherein the bottom hole assembly is retrievable.

3. The method of claim 1, wherein the bottom hole assembly is non-retrievable.

4. The method of claim 1, wherein the tubular is a drill pipe, a casing, or a combination thereof.

5. The method of claim 1, wherein at least a portion of the wellbore extends at a direction that is slanted from vertical.

6. The method of claim 1, further comprising circulating a drilling fluid in the wellbore while drilling the wellbore, wherein at least a portion of the drilling fluid is displaced from the wellbore by the consolidating spacer fluid.

7. The method of claim 1, further comprising allowing at least a portion of the consolidating spacer fluid to consolidate in the wellbore to have a transition time of about 45 minutes or less.

8. The method of claim 1, further comprising allowing at least a portion of the consolidating spacer fluid to consolidate in the wellbore to have at least one property selected from the group consisting of: (i) a yield point of from about 25 Pascals to about 250 pascals; (ii) a static gel strength of from about 70 lbf/100 ft$^2$ to about 500 lbf/100 ft$^2$, (iii) a yield limit in compression from about 1 psi to about 2,000 psi, and (iv) an unconfined uniaxial compressive strength of from about 5 psi to about 10,000 psi.

9. The method of claim 1, further comprising allowing at least a portion of the consolidating spacer fluid to consolidate in the wellbore to have at least one property selected from the group consisting of: (i) a zero gel time of about 8 hours or less, (ii) a transition time of about 45 minutes or less, and (iii) a static gel strength of about 500 lbf/100 ft$^2$ in a time of from about 10 minutes to about 8 hours.

10. The method of claim 1, further comprising allowing at least a portion of the consolidating spacer fluid to consolidate in the wellbore and running a bond log to determine bonding of the consolidating treatment fluid to the casing.

11. The method of claim 1, wherein the consolidating spacer fluid has a density of about 4 pounds per gallon to about 13 pounds per gallon.

12. The method of claim 1, wherein the kiln dust is from the manufacture of cement.

13. The method of claim 1, wherein the kiln dust comprises $SiO_2$, $Al_2O_3$, $Fe_2O_3$, CaO, MgO, $SO_3$, $Na_2O$, and $K_2O$.

14. The method of claim 1, wherein the kiln dust is present in an amount from about 1% to about 65% by weight of the consolidating spacer fluid.

* * * * *